(12) United States Patent
Sakamoto

(10) Patent No.: US 7,727,582 B2
(45) Date of Patent: Jun. 1, 2010

(54) RUBBING METHOD AND METHOD AND APPARATUS FOR PRODUCING OPTICAL FILM

(75) Inventor: Masumi Sakamoto, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 523 days.

(21) Appl. No.: 11/387,736

(22) Filed: Mar. 24, 2006

(65) Prior Publication Data

US 2006/0216414 A1 Sep. 28, 2006

(30) Foreign Application Priority Data

Mar. 25, 2005 (JP) ............................. 2005-089559

(51) Int. Cl.
*B05D 5/06* (2006.01)
(52) U.S. Cl. ...................... 427/162; 118/325
(58) Field of Classification Search ................. 427/162; 118/325
See application file for complete search history.

(56) References Cited

U.S. PATENT DOCUMENTS 3,279,091 A * 10/1966 Freuler ......................... 34/642

6,957,998 B2 * 10/2005 Togawa ........................ 451/8

FOREIGN PATENT DOCUMENTS

| EP | 709832 A1 * | 5/1996 |
|----|----|----|
| JP | 8-160430 A | 6/1996 |
| JP | 8-160431 A | 6/1996 |
| JP | 2002-55345 A | 2/2002 |

OTHER PUBLICATIONS

Partial machine translation of JP-08-160431; JPO; pp. 1-11.*
Partial machine translation of JP-2002-055345; JPO; pp. 1-17.*
Machine English translation of detailed description for JP 08-160431; JPO; 2009; 11 pages.*

* cited by examiner

*Primary Examiner*—Michael Kornakov
*Assistant Examiner*—Alexander Weddle
(74) *Attorney, Agent, or Firm*—Sughrue Mion, PLLC

(57) ABSTRACT

According to the rubbing method of the present invention, since the support is pressed against the rubbing roller by applying fluid pressure to the backside of the support (web), uniform rubbing can be performed without generating wrinkles on the web. In other words, because the web is pressed by fluid pressure, the web follows the rubbing roller, and the orientation film on the surface of the web can be controlled to the optimal condition upon rubbing treatment without generating wrinkles on the web. With this, defects on the surface caused by poor orientation can be significantly reduced.

7 Claims, 13 Drawing Sheets

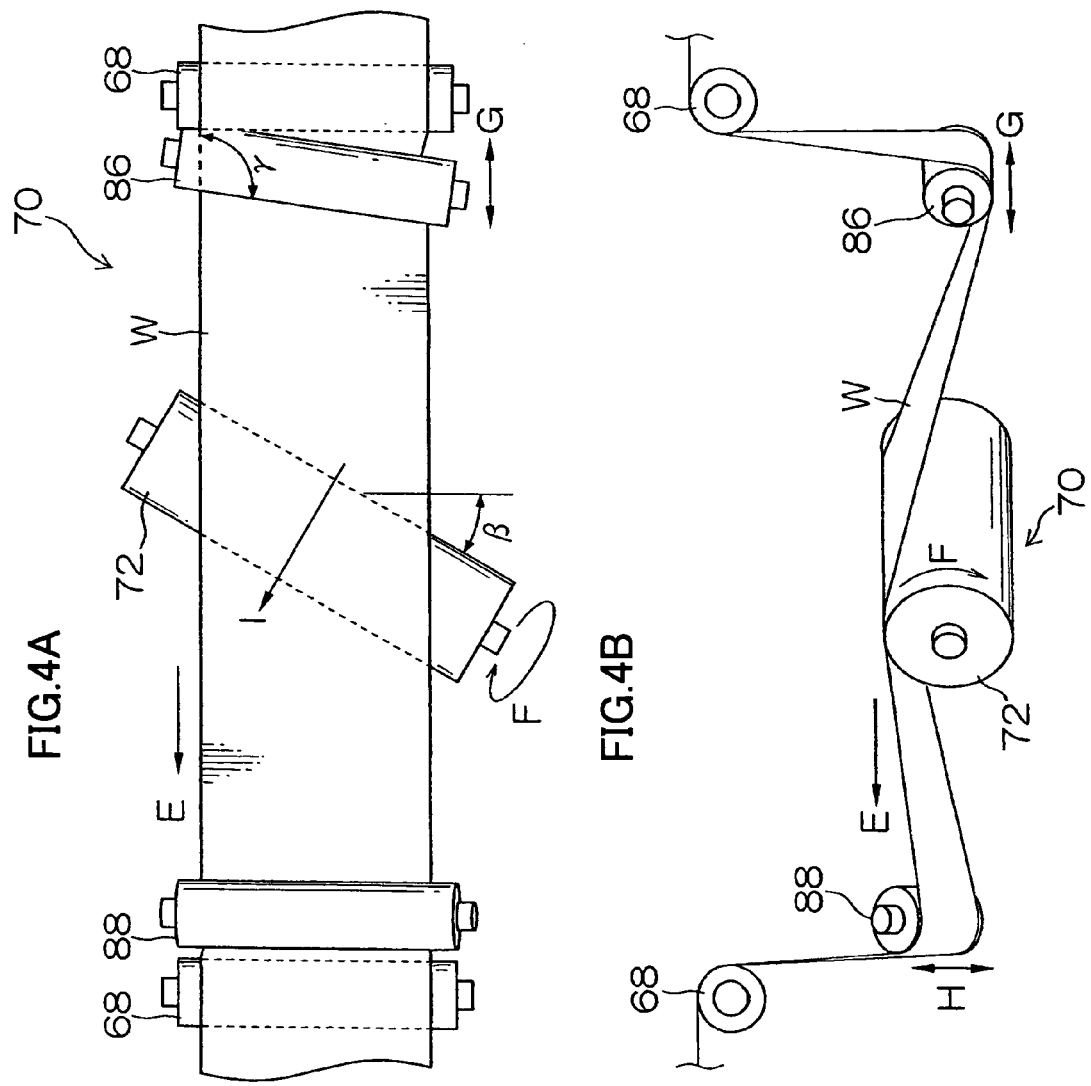

FIG.11A

| | | RATE V (m/min) | TENSION (N) | AIR PRESS PRESSURE P(Pa) | PRESSING WIDTH IN AIR PRESS S(mm) | AIR PRESS APPLYING TIME t(sec) | PRESSING PRESSURE IN AIR PRESS N1=PxSxW (N) | WORK OF AIR PRESS PER ROTATION Fs=μxN1xπD (Nm) | RUBBING ROTATION NUMBER N(RPM) | AMOUNT OF WORK PER UNIT AREA OF AIR PRESS (FsxN)/(VxW) (Nm/m²) |
|---|---|---|---|---|---|---|---|---|---|---|
| 1 | COM. EX. | 40 | 290 | 0 | | | | | 500 | 0 |
| 2 | PRESENT INVENTION | 40 | 290 | 900 | 3 | 0.0045 | 3.6 | 3.6 | 500 | 56.2 |
| 3 | PRESENT INVENTION | 40 | 290 | 1400 | 3 | 0.0045 | 5.6 | 5.6 | 500 | 87.4 |
| 4 | PRESENT INVENTION | 40 | 290 | 2100 | 3 | 0.0045 | 8.4 | 8.4 | 500 | 131.1 |
| 5 | PRESENT INVENTION | 40 | 290 | 3000 | 3 | 0.0045 | 12.1 | 12.0 | 500 | 187.2 |
| 6 | PRESENT INVENTION | 40 | 290 | 5000 | 3 | 0.0045 | 20.1 | 20.1 | 500 | 312.0 |
| 7 | PRESENT INVENTION | 40 | 290 | 7000 | 3 | 0.0045 | 28.1 | 28.1 | 500 | 436.9 |
| 8 | PRESENT INVENTION | 40 | 290 | 9000 | 3 | 0.0045 | 36.2 | 36.1 | 500 | 561.7 |

W : BASE WIDTH (1.34m)
μ : COEFFICIENT OF DYNAMIC FRICTION (1.06 OBTAINED IN A TEST)
D : RUBBING ROLL DIAMETER (300mm)

FIG.11B

| | | ORIENTATION | WRINKLES VISUALLY OBSERVED UPON RUBBING | STREAK UNEVENNESS, ORIENTATION UNEVENNESS CAUSED BY WRINKLES | DEFECTS, STREAKS CAUSED BY RUBBING |
|---|---|---|---|---|---|
| 1 | COM. EX. | POOR | POOR | POOR | GOOD |
| 2 | PRESENT INVENTION | MODERATE | GOOD | GOOD | GOOD |
| 3 | PRESENT INVENTION | GOOD | GOOD | GOOD | GOOD |
| 4 | PRESENT INVENTION | GOOD | GOOD | GOOD | GOOD |
| 5 | PRESENT INVENTION | GOOD | GOOD | GOOD | GOOD |
| 6 | PRESENT INVENTION | GOOD | GOOD | GOOD | GOOD |
| 7 | PRESENT INVENTION | GOOD | GOOD | GOOD | GOOD |
| 8 | PRESENT INVENTION | GOOD | GOOD | GOOD | MODERATE |

*COMPARATIVE EXAMPLE 1 AND EXAMPLES 2 AND 3 SHOW THAT ORIENTATION WAS IMPROVED AND WRINKLES UPON RUBBING WERE REDUCED BY EMPLOYING AIR PRESS
*EXAMPLES 2 TO 4 SHOW THAT THE HIGHER THE AIR PRESS PRESSURE, THE GREATER THE DEFECTS.

FIG.12A

| | RATE V (m/min) | TENSION (N) | AIR PRESS PRESSURE P(Pa) | PRESSING WIDTH IN AIR PRESS S(mm) | AIR PRESS APPLYING TIME t(sec) | PRESSING PRESSURE IN AIR PRESS N1=P×S×W (N) | WORK OF AIR PRESS PER ROTATION Fs=μ×N1×πD (Nm) | RUBBING ROTATION NUMBER N(RPM) | AMOUNT OF WORK PER UNIT AREA OF AIR PRESS (Fs×N)/(V×W) (Nm/m²) |
|---|---|---|---|---|---|---|---|---|---|
| 1 COM. EX. | 24 | 280 | 0 | | | | | 400 | 0 |
| 2 PRESENT INVENTION | 24 | 280 | 1400 | 3 | 0.0075 | 5.6 | 5.6 | 400 | 39.9 |
| 3 PRESENT INVENTION | 24 | 280 | 2100 | 3 | 0.0075 | 8.4 | 8.4 | 400 | 104.8 |
| 4 COM. EX. | 24 | 180 | 0 | | | | | 500 | 0 |
| 5 PRESENT INVENTION | 24 | 180 | 1400 | 3 | 0.0075 | 5.6 | 5.6 | 500 | 87.4 |
| 6 PRESENT INVENTION | 24 | 180 | 2100 | 3 | 0.0075 | 8.4 | 8.4 | 500 | 131.1 |
| 7 COM. EX. | 24 | 280 | 0 | | | | | 500 | 0 |
| 8 PRESENT INVENTION | 24 | 280 | 1400 | 3 | 0.0075 | 5.6 | 5.6 | 500 | 87.4 |
| 9 PRESENT INVENTION | 24 | 280 | 2100 | 3 | 0.0075 | 8.4 | 8.4 | 500 | 131.1 |
| 10 PRESENT INVENTION | 24 | 280 | 2100 | 6 | 0.015 | 16.9 | 16.9 | 500 | 262.1 |

W : BASE WIDTH (1.34m)
μ : COEFFICIENT OF DYNAMIC FRICTION (1.06 OBTAINED IN A TEST)
D : RUBBING ROLL DIAMETER (300mm)

FIG.12B

| | | EXTINCTION DEGREE INTENDED EXTINCTION: 0.002 OR LOWER | | | | | EXTINCTION DEGREE | WRINKLES VISUALLY OBSERVED UPON RUBBING | STREAK UNEVENNESS, ORIENTATION UNEVENNESS CAUSED BY WRINKLES | DEFECTS, STREAKS CAUSED BY RUBBING | LIFE OF CLOTH |
|---|---|---|---|---|---|---|---|---|---|---|---|
| | | Max(a) | Min(b) | a-b | AVERAGE c | (a-b)/c ×100% | | | | | |
| 1 | COM. EX. | 0.00278 | 0.00160 | 0.00118 | 0.00207 | 57 | POOR | POOR | POOR | GOOD | |
| 2 | PRESENT INVENTION | 0.00190 | 0.00145 | 0.00045 | 0.00158 | 28 | GOOD | GOOD | GOOD | GOOD | |
| 3 | PRESENT INVENTION | 0.00155 | 0.00140 | 0.00015 | 0.00144 | 10 | GOOD | GOOD | GOOD | GOOD | LONG |
| 4 | COM. EX. | 0.00527 | 0.00160 | 0.00367 | 0.00214 | 171 | POOR | POOR | POOR | GOOD | |
| 5 | PRESENT INVENTION | 0.00191 | 0.00139 | 0.00052 | 0.00155 | 34 | GOOD | GOOD | GOOD | GOOD | |
| 6 | PRESENT INVENTION | 0.00176 | 0.00148 | 0.00028 | 0.00160 | 18 | GOOD | GOOD | GOOD | GOOD | SHORT |
| 7 | COM. EX. | 0.00162 | 0.00145 | 0.00017 | 0.00151 | 11 | POOR | POOR | POOR | GOOD | |
| 8 | PRESENT INVENTION | 0.00162 | 0.00147 | 0.00015 | 0.00152 | 10 | GOOD | GOOD | GOOD | GOOD | |
| 9 | PRESENT INVENTION | 0.00155 | 0.00139 | 0.00016 | 0.00144 | 11 | GOOD | GOOD | GOOD | GOOD | |
| 10 | PRESENT INVENTION | | | | | | GOOD | GOOD | GOOD | GOOD | |

(1) COMPARATIVE EXAMPLE 1 AND EXAMPLES 2 AND 3 SHOW THAT THE INTENDED EXTINCTION DEGREE (ORIENTATION) WAS OBTAINED AND WRINKLES UPON RUBBING WERE REDUCED BY EMPLOYING AIR PRESS.

(2) COMPARATIVE EXAMPLE 4 AND EXAMPLES 5 AND 6 SHOW THAT THE INTENDED EXTINCTION DEGREE (ORIENTATION) WAS OBTAINED AND WRINKLES UPON RUBBING WERE REDUCED BY EMPLOYING AIR PRESS.

(3) COMPARATIVE EXAMPLE 7 AND EXAMPLES 8 AND 9 SHOW THAT WRINKLES UPON RUBBING WERE REDUCED BY EMPLOYING AIR PRESS.

(4) COMPARATIVE EXAMPLE 7 AND EXAMPLES 5 AND 6 SHOW THAT THE INTENDED EXTINCTION DEGREE (ORIENTATION) WAS OBTAINED, TENSION WAS DECREASED AND WRINKLES UPON RUBBING WERE REDUCED BY EMPLOYING AIR PRESS.

(5) COMPARATIVE EXAMPLE 7 AND EXAMPLE 3 SHOW THAT THE INTENDED EXTINCTION DEGREE (ORIENTATION) WAS OBTAINED, THE ROTATION NUMBER WAS REDUCED, THE LIFE OF THE CLOTH WAS EXTENDED, AND WRINKLES WERE REDUCED UPON RUBBING BY EMPLOYING AIR PRESS.

RUBBING METHOD AND METHOD AND APPARATUS FOR PRODUCING OPTICAL FILM

BACKGROUND OF THE INVENTION

1. Field of the Invention

The present invention relates to a rubbing method and a method and an apparatus for producing an optical film, and particularly to a rubbing method suitable for forming a liquid crystal orientation film for uniformly orienting liquid crystal molecules and a method and an apparatus for producing an optical film to which the rubbing method is applied.

2. Description of the Related Art

Recently, demand for optical films is increasing. Typical examples of such optical films include optical compensation films used as retardation films in liquid crystal cells, antireflection films and antiglare films, which have various functions.

Typical methods of producing such optical films include a method which comprises performing rubbing treatment on the surface of a belt-shaped flexible support (hereinafter referred to as a "web"), applying a coating solution to the surface of the web using various coating apparatuses and drying and then curing the same to form a coated film (functional film) of various compositions.

The rubbing treatment is a typical technique for orienting liquid crystal molecules in the production of liquid crystal display devices, and generally an orientation film is formed on the surface of a web and the surface of the orientation film is rubbed in one direction by a rubbing roller.

In such production of optical films, poor orientation due to unstable rubbing treatment conditions, which is one of the causes of decreased yield, has become a problem. Thus, various proposals have been made in order to reduce such poor orientation (see Japanese Patent Application Laid-Open Nos. 8-160431, 8-160430 and 2002-55345).

Japanese Patent Application Laid-Open No. 8-160431 proposes a construction in which a rubbing roller is disposed between two, transfer rollers and a web is transferred while being wound on the rubbing roller, enabling continuous production.

Japanese Patent Application Laid-Open No. 8-160430 proposes a construction in which a long web is wound around a rubbing roller disposed diagonally to the traveling direction of the web and the traveling direction of the web is changed to perform continuous rubbing. It is described that this technique is capable of uniformly rubbing orientation films.

Japanese Patent Application Laid-Open No. 2002-55345 proposes a construction in which hot air at about a phase transition temperature of SmA-SmC is sprayed to the web through a spray nozzle, and it is described that an orientation film can be uniformly rubbed under heating and pressurization.

SUMMARY OF THE INVENTION

However, poor orientation has not been significantly reduced even in the constructions disclosed in Japanese Patent Application Laid-Open Nos. 8-160431, 8-160430 and 2002-55345, and poor orientation still remains a problem as a cause of decreased yield.

To put it more specifically, the first problem is that uniform rubbing is impossible because of irregularities and wrinkles present on the web in the width direction. The second problem is that when the transfer rate of the web is increased, the time for rubbing treatment is shortened, and therefore it becomes necessary to increase the rotation number of the rubbing roller, increase the wrap angle (angle of wrapping) of the web on the rubbing roller and/or increase the tension of the web; as a result, the tension of the web is increased in the downstream of the rubbing roller and wrinkles are formed on the web, causing a problem that uniform rubbing is impossible.

The present invention has been made in view of such circumstances, and aims at providing a rubbing method capable of significantly reducing defects on the surface caused by poor orientation in rubbing treatment, in particular, rubbing treatment in the production of optical films, and a method and an apparatus for producing an optical film.

To accomplish the aforementioned object, the present invention provides a rubbing method for performing rubbing treatment on a surface of a belt-shaped flexible support by winding the support around a rotating rubbing roller while continuously transferring the support, the rubbing method comprising: pressing the support against the rubbing roller by applying a fluid pressure to a backside of the support.

According to the present invention, since the support is pressed against the rubbing roller by applying fluid pressure to the backside of the support (web), uniform rubbing can be performed without generating wrinkles on the web. In other words, because the web is pressed by fluid pressure, the web follows the rubbing roller, and the orientation film on the surface of the web can be controlled to the optimal condition upon rubbing treatment without generating wrinkles on the web. With this, defects on the surface caused by poor orientation can be significantly reduced.

As described by "applying fluid pressure", fluid for applying pressure includes not only gas exemplified below but also liquid. For example, a configuration in which water is filled in a flexible bag (a bag made of resin or rubber) and the web is pressed against the rubbing roller by putting the bag on the backside of the web can also be adopted.

In the present invention, it is preferred that the fluid pressure is applied to the support by spraying gas to the backside of the support through at least one nozzle having a length substantially the same as a width of the support. In the present invention, it is also preferred that the fluid pressure is applied to the support by spraying gas to the backside of the support through a plurality of nozzles disposed in a width direction of the support.

When a support (web) is pressed against a rubbing roller by gas sprayed through a nozzle as described above, uniform rubbing can be achieved in a relatively simple construction without generating wrinkles on the web.

In the present invention, it is preferred that the fluid pressure is applied to the support by introducing gas into a housing disposed on the backside of the support, the housing having an opening with an inside length substantially the same as a width of the support and an inside width substantially the same as a width corresponding to a pre-determined circumferential angle of the rubbing roller.

When such a housing which covers a pre-determined length of the support (web) in the width direction is used to press the support (web) against the rubbing roller by gas in the housing, the applied pressure comes close to the static pressure, and in addition to an advantage of being able to perform uniform rubbing without generating wrinkles on the web, there is an advantage that the amount of gas can be reduced compared to the case of spraying gas using a nozzle.

The above-described "length substantially the same as the width of the support" of the nozzle or the housing means not only the width of the support in the direction perpendicular to the traveling direction of the support, but also the width of the support in the case where a pre-determined rubbing angle is given. This is based on the fact that in usual rubbing treatment, rubbing is generally performed while forming a predetermined rubbing angle by rotating a rubbing roller in the horizontal plane relative to the traveling direction of the support.

In the present invention, it is also preferred that a fluid pressure of 900 to 7000 Pa is applied to the support for 0.0045 to 0.015 second. Pressurization under such conditions ensures rubbing conditions with an appropriate amount of work, further exhibiting the advantage of the present invention.

The present invention also provides a method for producing an optical film, which comprises: performing rubbing treatment by the aforementioned rubbing method; and forming a functional film by applying a coating solution to the surface of the support by a coating device after the rubbing treatment.

To this end, the present invention also provides an apparatus for producing an optical film comprising: a support transfer device which continuously transfers a belt-shaped flexible support, a rubbing device which performs rubbing treatment while a surface of the support is wound around a rotating rubbing roller, the rubbing device being equipped with a pressing device which applies fluid pressure to the backside of the support, thereby pressing the support against the rubbing roller, and a coating device which applies a coating solution to the surface of the support after the rubbing treatment.

According to the present invention, since uniform rubbing can be achieved and defects on the surface caused by poor orientation can be significantly reduced, high quality optical films can be obtained.

The "optical film" includes optical compensation films, antireflection films and antiglare films having various functions.

As described above, according to the present invention, the orientation film on the surface of the web can be controlled to the optimal condition upon rubbing treatment, and defects on the surface caused by poor orientation can be significantly reduced.

BRIEF DESCRIPTION OF THE DRAWINGS

FIGS. 4A to 4C are plan, front and left side views illustrating a detailed construction of a rubbing apparatus;

FIGS. 11A and 11B are tables showing the conditions and the results in Example 2; and FIGS. 12A and 12B are tables showing the conditions and the results in Example 3.

DETAILED DESCRIPTION OF THE PREFERRED EMBODIMENTS

Figure 1:
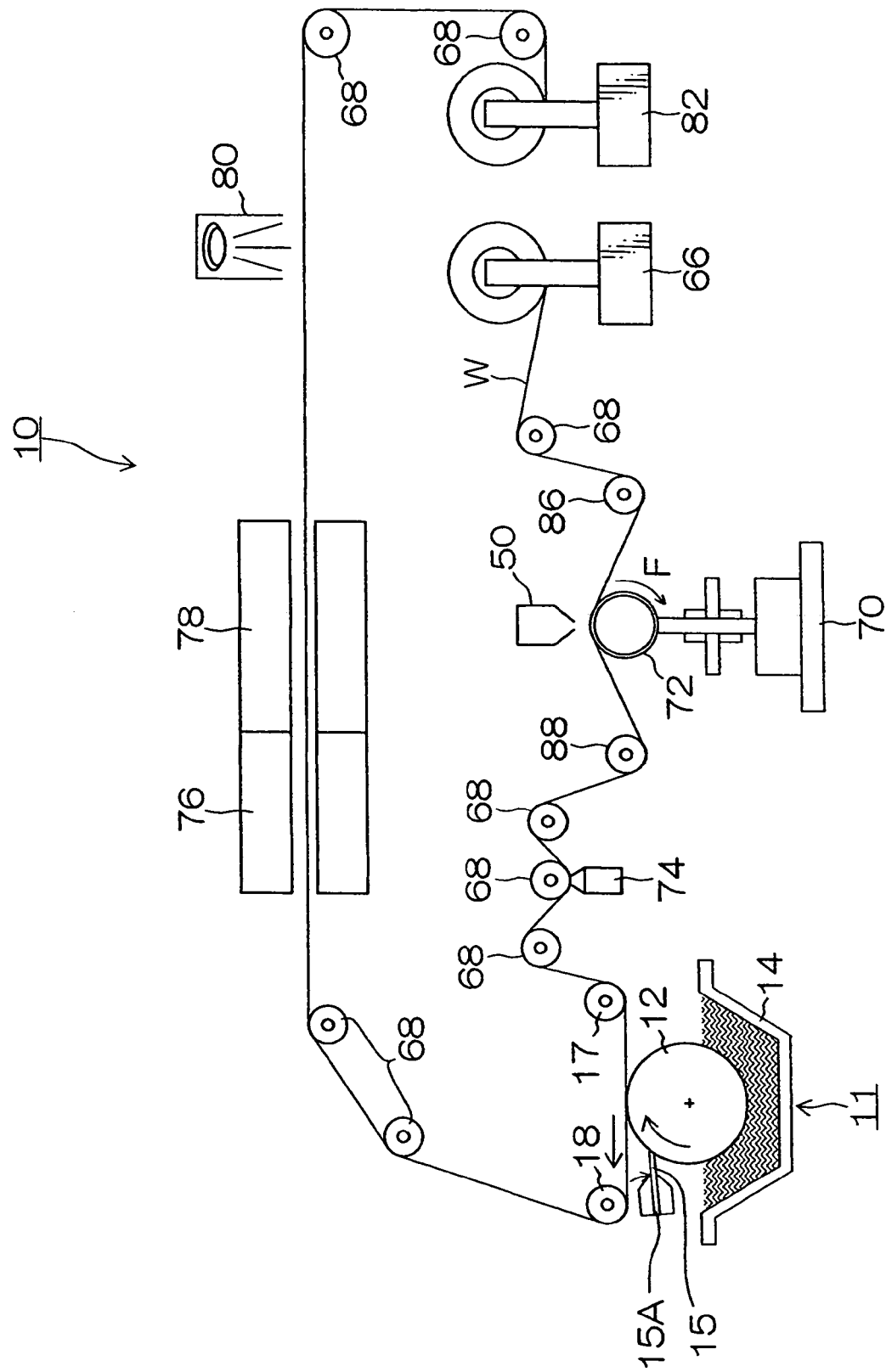
FIG. 1 is an explanatory view illustrating a production line for an optical film to which the rubbing method and the method and the apparatus for producing an optical film of the present invention are applied.

In the following, a preferred embodiment (first embodiment) of the rubbing method and the method and the apparatus for producing an optical film of the present invention is described in detail with reference to the attached drawings. FIG. 1 is an explanatory view illustrating a production line for an optical film to which the rubbing method and the method and the apparatus for producing an optical film of the present invention are applied.

As shown in FIG. 1, in the production line 10 for an optical film, a feeder 66 feeds a web W which is a transparent support on which a polymer layer for an orientation film is previously formed. The web W is guided by a guide roller 68 and introduced into a rubbing treatment apparatus 70 (rubbing device). A rubbing roller 72 is disposed so as to perform rubbing treatment on the polymer layer. The rubbing treatment apparatus 70 is described later.

A dust removing device 74 is disposed in the downstream of the rubbing roller 72, where dust adhered to the surface of the web W is removed. A gravure coater 11 is installed in the downstream of the dust removing device 74 so as to apply a coating solution containing disconematic liquid crystal to the web W.

A drying zone 76 and a heating zone 78 are provided in that order in the downstream, where a liquid crystal layer is formed on the web W. Further, an ultraviolet lamp 80 is provided in the downstream, and the liquid crystal is crosslinked by ultraviolet irradiation to form the desired polymer. The web W on which a polymer is formed is taken up by a winder 82 provided in the downstream.

The rubbing treatment apparatus 70 performs rubbing treatment on the polymer layer. In this embodiment, the rubbing treatment apparatus 70 has a single stage roller structure using the rubbing roller 72. For the rubbing treatment apparatus 70, a multi-stage roller structure may also be adopted.

In the rubbing treatment apparatus 70, the rubbing roller 72 whose outer surface is covered with rubbing fabric made of flocked fabric such as velvet is rotationally driven in the direction of the arrow F, and the rotational speed can be controlled from, for example, about 10 to about 1000 rpm. Referring to the shape of the rubbing roller 72, the rubbing roller 72 may be, for example, a roller having an outer diameter of 50 to 500 mm and slightly longer than the width of the web W also in the case where a rubbing angle is given. The rubbing treatment apparatus 70 is rotatable in the horizontal plane relative to the traveling direction of the web W so as to adjust the rubbing angle to any value.

On the upper side of the rubbing roller 72, an unrepresented roller stage is provided, and back-up rollers 86, 88 are rotatably installed by means of a spring at the bottom of the roller stage at a position causing no interference with the rubbing roller 72. The back-up rollers 86, 88 are equipped with a tension detector 90 which detects the tension of the web W (see FIG. 5), enabling control of the tension upon rubbing. The tension detector 90 is described later.

The back-up rollers 86, 88 are vertically adjustable and the wrap angle of the web W on the rubbing roller 72 can be adjusted by moving the rollers up and down.

Further, an air nozzle 50 is disposed over the rubbing roller 72 so that gas (air, nitrogen gas, etc.) is sprayed to the backside of the web W and the web W is pressed against the rubbing roller 72.

Figure 2A:
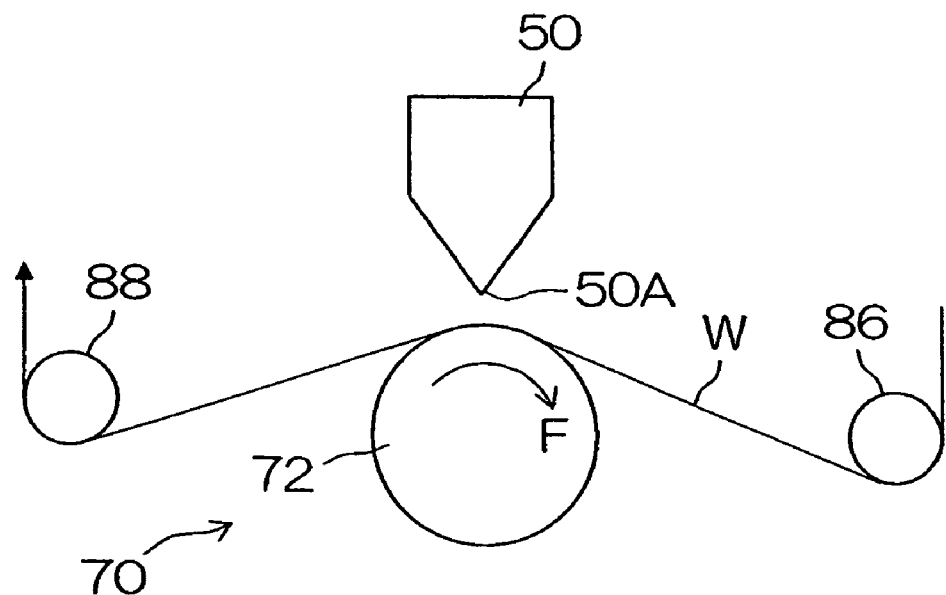
FIGS. 2A and 2B are enlarged front and side views of essential parts illustrating the position of an air nozzle and a rubbing treatment apparatus.
Figure 2B:
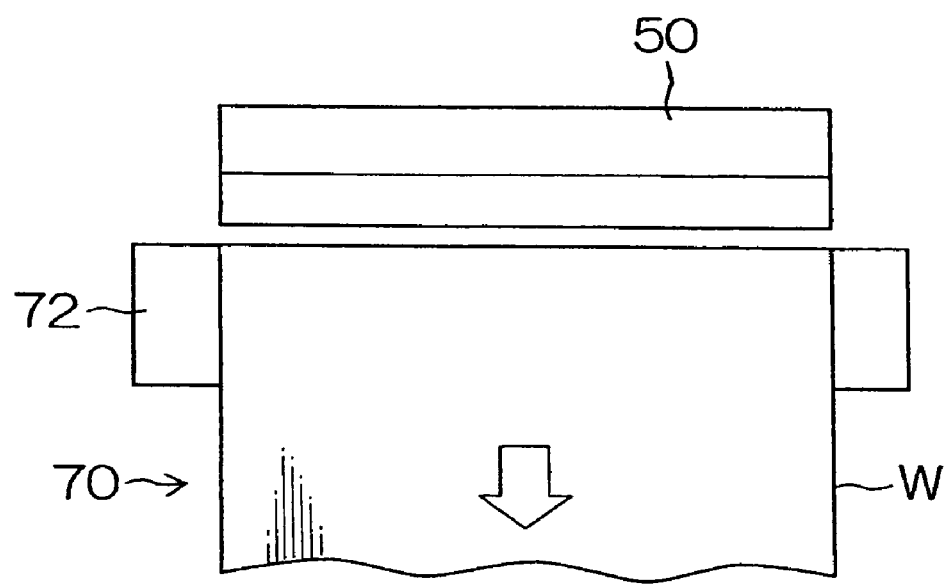

FIGS. 2A and 2B are enlarged views of essential parts illustrating the position of an air nozzle 50 and a rubbing treatment apparatus 70. FIG. 2A is a front view, and FIG. 2B is a left side view. As shown in FIG. 2B, the air nozzle 50 has a length substantially the same as the width of the web W (including the width of the web W in the case where a predetermined rubbing angle is given), and is disposed so that the tip 50A, which is an outlet, is parallel to the axis of the rubbing roller 72.

Gas is sprayed to the position of the center line bisecting the wrap angle of the web W. Accordingly, the gas can be sprayed to the backside of the web W at a uniform pressure in the width direction, allowing the web W to be pressed against the rubbing roller 72.

Representation of an air supply device which supplies gas to the air nozzle 50 (an air tube, a blower or an air compressor, etc.) is omitted.

Detailed constructions of the rubbing roller 72 are now described with reference to FIGS. 3A and 3B to FIG. 5.

Figure 3A:
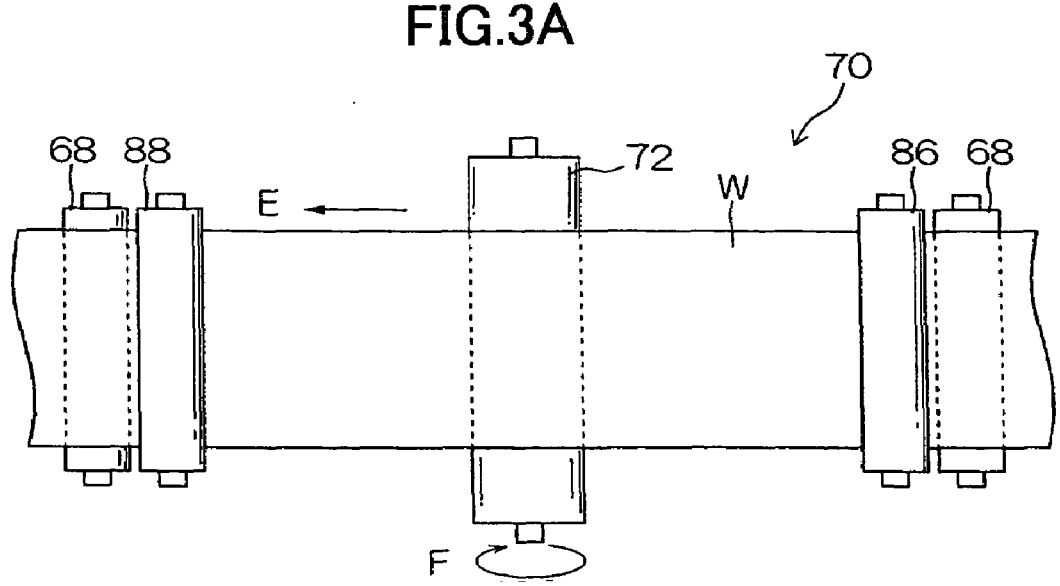
FIGS. 3A and 3B are plan and front views illustrating a detailed construction of a rubbing apparatus.
Figure 3B:
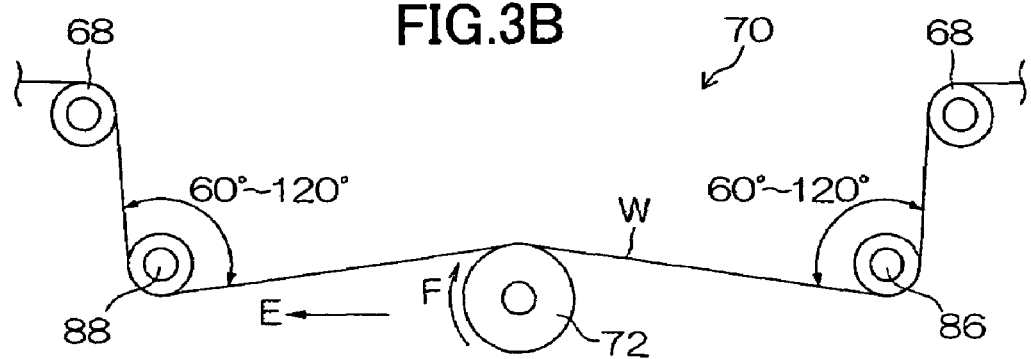

FIGS. 3A and 3B are views illustrating a detailed construction of a rubbing apparatus 70. FIG. 3A is a plan view, and FIG. 3B is a front view. The rubbing apparatus 70 is composed of a rubbing roller 72, the above-described back-up rollers 86, 88 disposed in the upstream and the downstream of the rubbing roller 72, and guide rollers 68, 68 disposed on the upper side of the back-up rollers 86, 88.

The guide rollers 68, 68 are disposed at a distance greater than the width of the web W from the back-up rollers 86, 88. The wrap angle of the web W on the guide rollers 68, 68 is 60° to 120°.

In the rubbing apparatus 70, the web W is transferred in the direction of the arrow E at a constant transfer tension (5 to 1000N) and a constant transfer rate (1 to 100 m/minute). For the web W, those 100 to 3000 mm in width and 1 to 1000 μm in thickness may be mostly used. On the underside of the web W, an orientation film (not shown) composed of polyimide or PVA (polyvinyl alcohol) is formed.

As shown in FIGS. 4A to 4C, when the web W is subjected to diagonal rubbing treatment, the rubbing roller 72 standing by under the web W is horizontally rotated so as to set the rubbing angle $\beta$. The angle $\beta$ is adjustable in the range of 0° to 75° and an appropriate angle can be selected based on the desired rubbing direction.

The rubbing roller 72 is then lifted to the pre-determined position or the back-up rollers 86, 88 are put down to the pre-determined position to put the orientation film surface of the web W over the rubbing roller 72. Then, the back-up rollers 86, 88 and guide rollers 68, 68 transfer the web W in the direction of the arrow E. At the same time, the rubbing roller 72 is rotated in the direction opposite from the transfer direction E of the web W, i.e., in the direction of the arrow F.

Regarding the wrap angle of the web W on the rubbing roller 72, an appropriate angle from 0° to 180° can be selected based on conditions such as the distance between the rubbing roller 72 and the back-up rollers 86, 88, and in view of the transfer stability of the web W, the angle is preferably from 1° to 20°.

At that time, the back-up roller 86 is rotationally displaced in the direction perpendicular to the incoming direction of the web W toward the back-up roller 86 (the direction of the arrow G) at an angle of $\gamma$, adjusting the tension of the web W in the width direction. Likewise, the back-up roller 88 is rotationally displaced in the direction perpendicular to the incoming direction of the web W toward the back-up roller 88 (the direction of the arrow H) at an angle of $\delta$, adjusting the tension of the web W in the width direction.

The web W whose tension in the width direction is adjusted by the back-up rollers 86, 88 is continuously transferred over the rubbing roller 72, and the surface of the orientation film of the web W is continuously rubbed by the rubbing roller 72 in the direction of the arrow I. The angle $\gamma$ and $\delta$ are variable within the range of 0° to ±20°.

Figure 5:
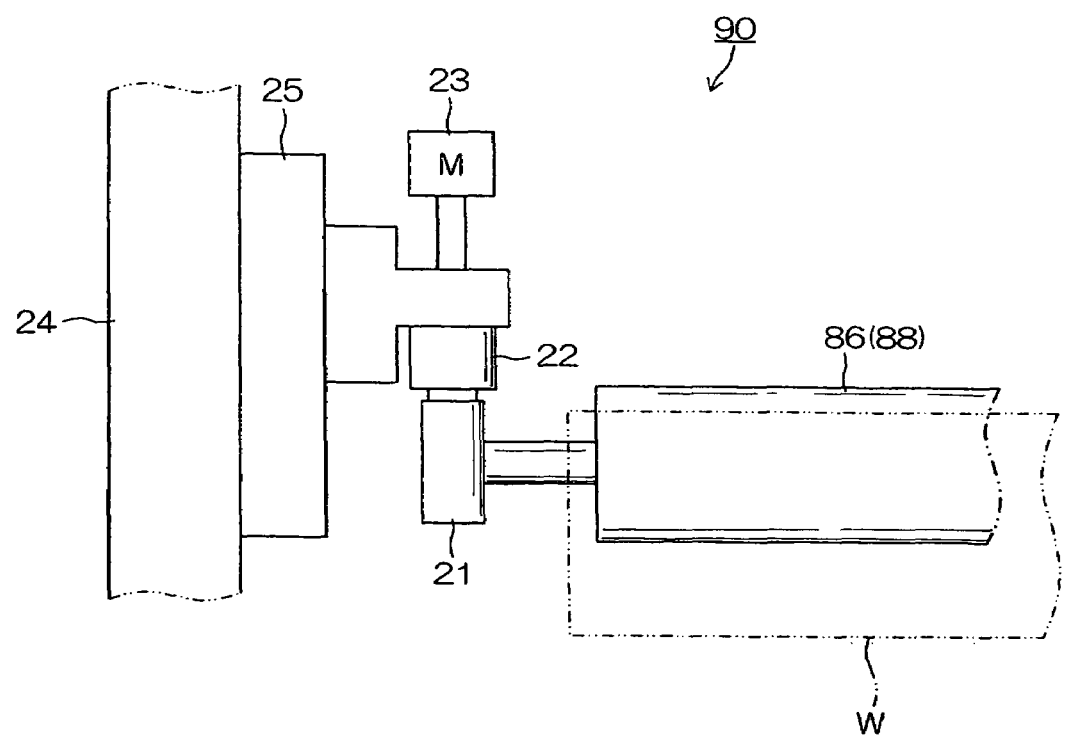
FIG. 5 is a view illustrating a detailed construction of a rubbing apparatus.

As shown in FIG. 5, on both ends of the back-up rollers 86, 88, a roller bearing 21, a tension detector 22 and a motor 23 for moving the roller bearing 21 are installed. The roller bearing 21 is movable on a slide rail 25 fixed on a columnar support 24 by the motor 23.

The tension detector 22 constantly measures the tension of the web W contacting the back-up rollers 86, 88 in the width direction. When the difference in the tension between both ends of the web W exceeds a certain value, i.e., when a tension difference which may cause poor rubbing is generated, the motor 23 is activated to rotationally displace the back-up rollers 86, 88, releasing the difference in the tension between both ends of the web W.

With the above-described construction, the resin layer on the surface (underside) of the web W is rubbed by the rubbing roller 72 pressed against the web W from below, while being pressed by the back-up rollers 86, 88 from above.

The constructions in the downstream of the rubbing treatment apparatus 70 are now described.

Referring to the dust removing device 74, various known devices may be used. For example, a dust removing device having a configuration in which dust adhered to the surface of the web W is removed by spraying compressed air (nitrogen gas) from which dust is removed electrostatically on the surface of the web W may be employed.

The gravure coater 11 applies a coating solution to the web W moving while being guided by an upstream guide roller 17 and a downstream guide roller 18 by a rotationally driven gravure roller 12. The upstream guide roller 17 and the downstream guide roller 18 are disposed so that the web W moves while being pressed against the gravure roller 12 at a predetermined pressure.

The gravure roller 12, the upstream guide roller 17 and the downstream guide roller 18 have a length substantially the same as the width of the web W.

Of these, the gravure roller 12 has a diameter of preferably 20 to 250 mm. When the diameter of the gravure roller 12 is within such a range, vibration of the web W can be advantageously prevented. The diameter of the upstream guide roller 17 and the downstream guide roller 18 is not particularly limited, but is preferably 60 mm or larger. When the diameter of the upstream guide roller 17 and the downstream guide roller 18 is within such a range, vibration of the web W can be advantageously prevented.

The gravure roller 12 is rotationally driven as shown by the arrow in FIG. 1. The rotation direction is opposite from the traveling direction of the web W. Application under forward rotation opposite from the rotation direction in FIG. 1 may also be adopted depending on the coating condition (e.g., installation of doctor blade).

The gravure roller 12 is driven by direct drive (directly connected to the axis) using an inverter motor, or may be driven by various motors combined with a reduction gear (gear head) or by a winding communication device such as a timing belt leading from various motors.

The cell structure of the surface of the gravure roller 12 may be a known pyramidal, quadrangular or trihelical structure. An appropriate cell is selected depending on the application speed, the viscosity of the coating solution and the thickness of the coating layer.

A liquid receiving pan 14 is put under the gravure roller 12, which is filled with a coating solution. The bottom half of the gravure roller 12 is dipped in the coating solution. With this construction, the coating solution is supplied to the cell on the surface of the gravure roller 12.

A doctor blade 15 is disposed at about 10 o'clock relative to the gravure roller 12 in such a manner that the tip of the blade touches the roller to wipe off extra coating solution before coating. The doctor blade 15 is energized by an unrepresented energizing device in the direction of the arrow in FIG. 1 with the rotation center 15A at the end being the center.

The gravure coater 11 is an example of coating devices and different types of coating devices may also be used. As such coating devices, a bar coater, a roll coater (a transfer roll coater, a reverse roll coater), a die coater, an extrusion coater, a fountain coater, a curtain coater, a dip coater, a spin coater, a spray coater or a slide hopper may be used.

Referring to the drying zone 76 and the heating zone 78 in the downstream of the gravure coater 11, any configuration may be adopted as long as they are capable of drying a coated layer and forming a liquid crystal layer on the web W. For example, a drying zone 76 and a heating zone 78 tunnel-shaped as shown in FIG. 1, in which a drying device and a heating device (heater, hot air generator) are installed may be used.

As for the ultraviolet lamp 80, those capable of cross-linking liquid crystal by ultraviolet irradiation to form the desired polymer may be used.

The winder 82 disposed in the downstream of the ultraviolet lamp 80 is designed to take up the web W on which a polymer is formed.

In this embodiment, the entire production line 10 for an optical film, particularly the gravure coater 11, is to be placed in a clean atmosphere such as a clean room. In that case, the cleanliness is preferably class 1000 or lower, more preferably class 100 or lower, and further preferably class 10 or lower.

Now, materials constituting the optical film are described.

It is preferred that a polymer film having a light transmittance of 80% or more is used as the web W in the present invention. A polymer film in which birefringence due to external force is less likely to occur is preferably used. Preferred examples of such polymer include cellulose polymers, norbornene polymers (e.g., ARTON available from JSR Corporation, ZEONOR and ZEONEX both available from ZEON CORPORATION) and cellulose polymers containing polymethyl methacrylate. Of these, cellulose esters are more preferred, and lower fatty acid esters of cellulose are further preferred.

The lower fatty acid means fatty acid having 6 or less carbon atoms. The number of the carbon atoms is preferably 2 (cellulose acetate), 3 (cellulose propionate) or 4 (cellulose butyrate). Preferred cellulose esters include cellulose acetate, and examples thereof include diacetyl cellulose and triacetyl cellulose. A mixed fatty acid ester such as cellulose acetate propionate and cellulose acetate butyrate may also be used.

Generally, substitution of the hydroxyl group at the 2nd, 3rd and 6th position of cellulose acetate is not equally distributed one-third each of the total substitution degree, and the substitution degree of the hydroxyl group at the 6th position tends to be smaller. In the present invention, the higher the substitution degree of the hydroxyl group at the 6th position of cellulose acetate than that at the 2nd or 3rd position, the better.

The hydroxyl group at the 6th position is substituted by an acyl group in a proportion of preferably 30% to 40%, more preferably 31% or higher and particularly preferably 32% or higher based on the total substitution degree. Further, it is preferred that the substitution degree by an acyl group at the 6th position of cellulose acetate is 0.88 or higher.

The 6th hydroxyl group may be substituted by an acyl group having 3 or more carbon atoms such as a propionyl group, a butyloyl group, a valeroyl group, a benzoyl group or an acryloyl group, other than an acetyl group. The substitution degree at each position can be measured by NMR.

Referring to cellulose acetate used in the present invention, cellulose acetates obtained by the synthesis methods described in Synthesis Example 1 in paragraphs 0043 and 0044, Synthesis Example 2 in paragraphs 0048 and 0049 and Synthesis Example 3 in paragraphs 0051 and 0052 in Japanese Patent Application Laid-Open No. 11-5851 may be used.

To adjust the retardation of the polymer film, an aromatic compound containing at least two aromatic rings is used as a retardation increasing agent.

When a cellulose acetate film is used as the polymer film, the aromatic compound is used in a proportion of 0.01 to 20 parts by mass based on 100 parts by mass of cellulose acetate. The aromatic compound is used in a proportion of preferably 0.05 to 15 parts by mass, more preferably 0.1 to 10 parts by mass based on 100 parts by mass of cellulose acetate. Two or more aromatic compounds may be used in combination. Examples of aromatic rings in the aromatic compound include aromatic heterocycles in addition to aromatic hydrocarbon rings.

A particularly preferred aromatic hydrocarbon ring is a 6-membered ring (i.e., a benzene ring). The aromatic heterocycle generally means an unsaturated heterocycle. The aromatic heterocycle is preferably a 5-membered ring, a 6-membered ring or a 7-membered ring, and more preferably a 5-membered ring or 6-membered ring. The aromatic heterocycle generally contains the largest amount of double bonds. Heteroatoms such as a nitrogen atom, an oxygen atom and a sulfur atom are preferred, and nitrogen atom is particularly preferred.

Examples of aromatic heterocycles include a furan ring, a thiophene ring, a pyrrole ring, an oxazole ring, an isooxazole ring, a thiazole ring, an isothiazole ring, an imidazole ring, a pyrazole ring, a furazan ring, a triazole ring, a pyran ring, a pyridine ring, a pyridazine ring, a pyrimidine ring, a pyrazine ring and a 1,3,5-triazine ring. Aromatic rings such as a benzene ring, a furan ring, a thiophene ring, a pyrrole ring, an oxazole ring, a thiazole ring, an imidazole ring, a triazole ring, a pyridine ring, a pyrimidine ring, a pyrazine ring and a 1,3,5-triazine ring are preferred, and a benzene ring and a 1,3,5-triazine ring are more preferred. It is particularly preferred that the aromatic compound contains at least one 1,3,5-triazine ring.

The number of aromatic rings that an aromatic compound contains is preferably 2 to 20, more preferably 2 to 12, further preferably 2 to 8, and most preferably 2 to 6. The binding manner of two aromatic rings may be classified into (a) bonded while forming a fused ring, (b) directly bonded via a single bond and (c) bonded via a linking group (no spiro bond can be formed because it is an aromatic ring). The binding manner may be any of (a) to (c).

Examples of fused rings in (a) (fused rings of two or more aromatic rings) include an indene ring, a naphthalene ring, an azulene ring, a fluorene ring, a phenanthrene ring, an anthracene ring, an acenaphthylene ring, a naphthacene ring, a pyrene ring, a indole ring, a isoindole ring, a benzofuran ring, a benzothiophene ring, an indolizine ring, a benzoxazole ring, a benzothiazole ring, a benzimidazole ring, a benzitriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxathiin ring, a phenoxazine ring and a thianthrene ring. A naphthalene ring, an azulene ring, an indole ring, a benzoxazole ring, a benzothiazole ring, a benzimidazole ring, a benzitriazole ring and a quinoline ring are preferred.

It is preferred that the single bond in (b) is a bond between carbon atoms of two aromatic rings. Two aromatic rings may be bonded via two or more single bonds to form an aliphatic ring or a non-aromatic heterocycle between the two aromatic rings.

It is preferred that the linking group in (c) is also bonded to carbon atoms of two aromatic rings. The linking group is preferably an alkylene group, an alkenylene group, an alkynylene group, —CO—, —O—, —NH—, —S— or a combination thereof. Examples of combined linking groups are shown below. The following left-and-right configurations of linking groups may be opposite.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have a substituent. Examples of substituents include a halogen atom (F, Cl, Br, I), a hydroxyl group, a carboxyl group, a cyano group, an amino group, a nitro group, a sulfo group, a carbamoyl group, a sulfamoyl group, an ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfonamide group, an aliphatic substituted amino group, an aliphatic substituted carbamoyl group, an aliphatic substituted sulfamoyl group, an aliphatic substituted ureido group and a non-aromatic heterocyclic group.

The alkyl group preferably contains 1 to 8 carbon atoms. Chain alkyl groups are more preferred than cyclic alkyl groups, and linear alkyl groups are particularly preferred. The alkyl group may further contain a substituent (e.g., a hydroxyl group, a carboxyl group, an alkoxy group, an alkyl substituted amino group). Examples of alkyl groups (including substituted alkyl groups) include methyl, ethyl, n-butyl, n-hexyl, 2-hydroxyethyl, 4-carboxybutyl, 2-methoxyethyl and 2-diethylaminoethyl. The alkenyl group preferably contains 2 to 8 carbon atoms. Chain alkenyl groups are more preferred than cyclic alkenyl groups, and linear alkenyl groups are particularly preferred. The alkenyl group may further contain a substituent.

Examples of alkenyl groups include vinyl, allyl and 1-hexenyl. The alkynyl group preferably contains 2 to 8 carbon atoms. Chain alkynyl groups are more preferred than cyclic alkynyl groups, and linear alkynyl groups are particularly preferred. The alkynyl group may further contain a substituent. Examples of alkynyl groups include ethynyl, 1-butynyl and 1-hexynyl.

The aliphatic acyl group preferably contains 1 to 10 carbon atoms. Examples of aliphatic acyl groups include acetyl, propanoyl and butanoyl. The aliphatic acyloxy group preferably contains 1 to 10 carbon atoms. Examples of aliphatic acyloxy groups include acetoxy. The alkoxy group preferably contains 1 to 8 carbon atoms. The alkoxy group may further contain a substituent (e.g., an alkoxy group).

Examples of alkoxy groups (including substituted alkoxy group) include methoxy, ethoxy, butoxy and methoxyethoxy. The alkoxycarbonyl group preferably contains 2 to 10 carbon atoms. Examples of alkoxycarbonyl groups include methoxycarbonyl and ethoxycarbonyl. The alkoxycarbonylamino group preferably contains 2 to 10 carbon atoms. Examples of alkoxycarbonylamino groups include methoxycarbonylamino and ethoxycarbonylamino.

The alkylthio group preferably contains 1 to 12 carbon atoms. Examples of alkylthio groups include methylthio, ethylthio and octhylthio.

The alkylsulfonyl group preferably contains 1 to 8 carbon atoms. Examples of alkylsulfonyl groups include methanesulfonyl and ethanesulfonyl.

The aliphatic amide group preferably contains 1 to 10 carbon atoms. Examples of aliphatic amide groups include acetamide. The aliphatic sulfonamide group preferably contains 1 to 8 carbon atoms. Examples of aliphatic sulfonamide groups include methanesulfonamide, butanesulfonamide and n-octanesulfonamide. The substituted aliphatic amino group preferably contains 1 to 10 carbon atoms. Examples of substituted aliphatic amino groups include dimethylamino, diethylamino and 2-carboxylethylamino.

The substituted aliphatic carbamoyl group preferably contains 2 to 10 carbon atoms. Examples of substituted aliphatic carbamoyl groups include methylcarbamoyl and diethylcarbamoyl. The substituted aliphatic sulfamoyl group preferably contains 1 to 8 carbon atoms. Examples of substituted aliphatic sulfamoyl groups include methylsulfamoyl and diethylsulfamoyl. The substituted aliphatic ureido group preferably contains 2 to 10 carbon atoms. Examples of substituted aliphatic ureido groups include methylureido. Examples of non-aromatic heterocyclic groups include piperidine and morpholino. The retardation increasing agent has a molecular weight of preferably 300 to 800.

Specific examples of retardation increasing agent are disclosed in Japanese Patent Application Laid-Open Nos. 2000-111914 and 2000-275434 and PCT/JP00/02619.

In the following, a case of using a cellulose acetate film as a polymer film will be described in detail. It is preferred that the cellulose acetate film is prepared by a solvent casting process. In the solvent casting process, a film is prepared by using a solution (dope) in which cellulose acetate is dissolved in an organic solvent.

It is preferred that the organic solvent contains a solvent selected from ethers having 3 to 12 carbon atoms, ketones having 3 to 12 carbon atoms, esters having 3 to 12 carbon atoms and halogenated hydrocarbons having 1 to 6 carbon atoms.

These ethers, ketones and esters may contain a cyclic structure. Compounds containing two or more of any functional groups such as ether, ketone and ester (i.e., —O—, —CO— and —COO—) may also be used as an organic solvent. The organic solvent may also contain another functional group such as an alcoholic hydroxyl group. In the case of an organic solvent containing two or more kinds of functional groups, the number of carbon atoms may be within the specified range of the compound containing any one of the functional groups.

Examples of ethers having 3 to 12 carbon atoms include diisopropyl ether, dimethoxymethane, dimethoxyethane, 1,4-dioxane, 1,3-dioxolane, tetrahydrofuran, anisole and phenetol. Examples of ketones having 3 to 12 carbon atoms include acetone, methyl ethyl ketone, diethyl ketone, diisobutyl ketone, cyclohexanone and methylcyclohexanone. Examples of esters having 3 to 12 carbon atoms include ethyl formate, propyl formate, pentyl formate, methyl acetate, ethyl acetate and pentyl acetate.

Examples of organic solvents containing two or more kinds of functional groups include 2-ethoxyethyl acetate, 2-methoxyethanol and 2-buthoxyethanol. The halogenated hydrocarbon preferably contains 1 or 2 carbon atoms, more preferably 1 carbon atom. The halogen in the halogenated hydrocarbon is preferably chlorine. Hydrogen atoms in halogenated hydrocarbon are substituted by halogen in a ratio of preferably 25 to 75% by mole, more preferably 30 to 70% by mole, further preferably 35 to 65% by mole, and most preferably 40 to 60% by mole. A typical halogenated hydrocarbon is methylene chloride.

From a technical viewpoint, halogenated hydrocarbon such as methylene chloride can be used without any problem, but in view of global environment and work environment, it is preferred that the organic solvent contains substantially no halogenated hydrocarbon. By the expression "contains substantially no halogenated hydrocarbon" is meant that the proportion of halogenated hydrocarbon in an organic solvent is less than 5% by mass (preferably less than 2% by mass). Further, it is preferred that halogenated hydrocarbon such as methylene chloride is not found in the produced cellulose acylate film at all. Two or more kinds of organic solvents may be used in a mixture.

A cellulose acetate solution can be prepared by a general method. The general method means treating the solution at 0° C. or higher (room temperature or high temperature). The solution may be prepared using a method and an apparatus for preparing dope in a usual solvent casting method. In the case of such a general method, halogenated hydrocarbon (particularly methylene chloride) is preferably used as an organic solvent. The amount of cellulose acetate is adjusted so that the prepared solution contains 10 to 40% by mass of cellulose acetate. The amount of cellulose acetate is more preferably 10 to 30% by mass.

Any of the additives described later may be added to the organic solvent (main solvent). The solution may be prepared by stirring cellulose acetate and an organic solvent at room temperature (0 to 40° C.). When the solution contains a high concentration of cellulose acetate, it may be stirred under pressure or heating. Specifically, cellulose acetate and an organic solvent are put in a pressure vessel, which is then sealed, and the mixture is stirred while heating the mixture under pressure to a temperature not lower than the boiling point of the solvent at ordinary temperature and at which the solvent does not boil. The heating temperature is generally 40° C. or higher, preferably 60 to 200° C., more preferably 80 to 110° C.

Each component may be introduced into a vessel after roughly mixing, or introduced sequentially. It is necessary that the vessel has a construction capable of stirring. The vessel may be pressurized by introducing inert gas such as nitrogen gas. Further, increase in the vapor pressure of the solvent due to heating may be utilized. Alternatively, each component may be added under pressure after sealing the vessel.

In the case of heating, it is preferred that the vessel is heated from the outside. For example, a jacket type heating apparatus may be used. Alternatively, a plate heater may be disposed outside the vessel and after piping, liquid is circulated therein to heat the entire vessel. It is preferred that a stirring blade is disposed inside the vessel and stirring is performed using the same. A stirring blade having a length extending close to the wall of the vessel is preferred. It is preferred that a scraper blade is installed at the tip of the stirring blade in order to renew the liquid film on the wall of the vessel. Measuring instruments such as a pressure gauge and a thermometer may also be installed. In the vessel, each component is dissolved in the solvent. The prepared dope is taken out from the vessel after cooling or cooled by a heat exchanger or the like after taking out from the vessel.

The cellulose acetate solution (dope) used in the present invention is prepared by the cooling dissolution method described below. First, cellulose acetate is gradually added to an organic solvent with stirring at about room temperature (−10 to 40° C.). In the case of using a plurality of solvents, the order of addition is not particularly limited.

For example, after adding cellulose acetate to a main solvent, another solvent (e.g., a gelling solvent such as alcohol) may be added thereto, or after wetting cellulose acetate with a gelling solvent, the main solvent may be added thereto, which is effective for preventing inhomogeneous dissolution. The amount of cellulose acetate is adjusted so that the mixture contains 10 to 40% by mass of cellulose acetate. The amount of the cellulose acetate is more preferably 10 to 30% by mass. Further, any of the additives described later may be previously added to the mixture.

The mixture is then cooled to −100 to −10° C. (preferably −80 to −10° C., more preferably −50 to −20° C., most preferably −50 to −30° C.). The mixture is cooled in a dry ice/methanol bath (−75° C.) or a cooled diethylene glycol solution (−30 to −20° C.). With this cooling, the mixture of cellulose acetate and the organic solvent is solidified. The cooling rate is not particularly limited, but in the case of batch cooling, the viscosity of the cellulose acetate solution increases due to cooling, resulting in poor cooling efficiency, and therefore a melting furnace effective for reaching a pre-determined cooling temperature is required.

Preparation of the cellulose acetate solution in the present invention is completed by swelling and passing the solution through a cooling apparatus set to a pre-determined cooling temperature for a short time. The higher the cooling rate, the better, but the upper limit thereof is theoretically 10000° C./second, technically 1000° C./second and practically 100° C./second.

The cooling rate refers to a value obtained by dividing the difference between the temperature at which cooling is started and the final cooling temperature by the time for reaching the final cooling temperature from the start of cooling. By further heating the resultant to 0 to 200° C. (preferably 0 to 150° C., more preferably 0 to 120° C., most preferably 0 to 50° C.), a solution in which cellulose acetate is fluidized in an organic solvent can be obtained. The temperature of the cooled mixture may be increased only by leaving the mixture at room temperature or by heating in a warm bath.

A homogeneous solution is obtained as described above. When dissolution is insufficient, operation of cooling and heating may be repeated. Whether dissolution is sufficient or not can be judged simply by visually observing the appearance of the solution.

In the cooling dissolution method, it is desired to use a sealed vessel to avoid mixing of moisture in the case of condensation upon cooling. Further, in cooling/heating operation, the time for dissolution can be shortened if the pressure is increased during cooling and reduced upon heating. For pressurization and decompression, a pressure resistant vessel is desirably used.

A 20% by mass solution in which cellulose acetate (acetylation degree: 60.9%, viscosity average polymerization degree: 299) is dissolved in methyl acetate by a cooling dissolution method has a pseudo phase transition temperature between a sol state and a gel state at about 33° C. when measured by differential scanning calorimetry (DSC), below which the solution is in a homogeneous gel state.

Accordingly, this solution must be stored at a temperature not lower than the pseudo phase transition temperature, preferably about 10° C. higher than the gel phase transition temperature. The pseudo phase transition temperature, however, varies depending on the acylation degree of cellulose acetate, the viscosity average polymerization degree, the solution concentration or the organic solvent used.

A cellulose acetate film is produced from the prepared cellulose acetate solution (dope) by a solvent casting process. It is preferred that the aforementioned retardation increasing agent is added to the dope. The dope is cast on a drum or a band and the solvent is evaporated to form a film. The concentration of the dope before casting is adjusted so that the solid content is 10 to 40%, more preferably 18 to 35%. It is preferred that the surface of the drum or the band is mirror finished.

The flow casting method and the drying method in the solvent casting process are described in U.S. Pat. Nos. 2,336,310, 2,367,603, 2,492,078, 2,492,977, 2,492,978, 2,607,704, 2,739,069 and 2,739,070, British Patent Nos. 640731 and 736892, Japanese Examined Application Publication Nos. 45-4554 and 49-5614, Japanese Patent Application Laid-Open Nos. 60-176834, 60-203430 and 62-115035.

The dope is cast on a drum or a band whose surface temperature is 10° C. or lower. It is preferred that the dope is dried by applying air flow for 2 seconds or more after casting. Alternatively, the obtained film is removed from the drum or the band and the remaining solvent is evaporated by drying with high temperature air flow whose temperature is sequentially changed from 100 to 160° C. The above methods are described in Japanese Examined Application Publication No. 5-17844. This method can shorten the time from casting to removal. To practice the method, it is necessary that the dope is gelled at the surface temperature of the drum or the band upon casting.

In the present invention, the obtained cellulose acetate solution may be cast on a smooth band or drum which is the web W in a single layer, or a plurality of cellulose acetate solutions may be cast thereon in two or more layers. In the case of casting a plurality of cellulose acetate solutions, a film may be produced by casting the respective solutions containing cellulose acetate through a plurality of casting ports provided at certain intervals in the traveling direction of the web W and stacking the same. For example, the methods described in Japanese Patent Application Laid-Open Nos. 6-158414, 1-122419 and 11-198285 may be adopted.

Further, a film may be formed by casting a cellulose acetate solution through two casting ports. For example, this may be practiced by the method described in Japanese Examined Application No. 60-27562 and Japanese Patent Application Laid-Open Nos. 61-94724, 61-947245, 61-104813, 61-158413 and 6-134933. Also, a method for casting a cellulose acetate film described in Japanese Patent Application Laid-Open No. 56-162617 in which a flow of a high viscosity cellulose acetate solution is covered with a low viscosity cellulose acetate solution and then the high viscosity cellulose acetate solution and the low viscosity cellulose acetate solution are simultaneously extruded may also be used.

Alternatively, a film may be prepared using two casting ports, while a film formed on the web W through the first casting port is peeled off and the second casting is performed on the surface which has been in contact with the web W. This method is described, for example, in Japanese Examined Application Publication No. 44-20235. Whether the cellulose acetate solutions to be cast may be the same or different is not particularly limited. For a plurality of cellulose acetate layers to be functional, a cellulose acylate solution corresponding to the function may be extruded through the respective casting ports.

Further, the cellulose acetate solution in the present invention may be cast together with another functional layer (e.g., an adhesive layer, a pigment layer, an anti-static layer, an anti-halation layer, a UV absorbing layer, a polarization layer, etc.). In the case of a conventionally used solution for a single layer, a high concentration, high viscosity cellulose acetate solution needs to be extruded in order to obtain the required film thickness. In that case, the cellulose acetate solution has poor stability and thus solids are formed, often causing problems such as spot troubles and poor flatness. To solve these problems, a plurality of cellulose acetate solutions are cast through a casting port, and this enables simultaneous extrusion of high viscosity solutions on the web W. As a result, not only a film with improved flatness excellent in the surface shape can be produced, but also drying load can be reduced through use of a thick cellulose acetate solution and the manufacturing speed of films can be improved.

To improve mechanical properties and increase the drying speed, a plasticizer may be added to the cellulose acetate film. For plasticizers, a phosphoric ester or a carboxylic ester may be used. Examples of phosphoric esters include triphenyl phosphate (TPP) and tricresyl phosphate (TCP). Typical examples of carboxylic esters include phthalate and citrate.

Examples of phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of citrates include O-acetyl triethyl citrate (OACTE) and O-acetyl tributyl citrate (OACTB).

Additional examples of carboxylic esters include butyl oleate, methylacetyl ricinoleate, dibutyl sebacate and various trimellitates. Phthalate plasticizers (DMP, DEP, DBP, DOP, DPP, DEHP) are preferably used. Particularly preferred are DEP and DPP. The plasticizer is added in a proportion of preferably 0:1 to 25% by mass, more preferably 1 to 20% by mass, further preferably 3 to 15% by mass based on the amount of cellulose ester.

Antidegradants (e.g., an antioxidant, a peroxide decomposer, a radical inhibitor, a metal deactivator, an acid scavenger, amine) may be added to the cellulose acetate film. Antidegradants are described in Japanese Patent Application Laid-Open Nos. 3-199201, 5-1907073, 5-194789, 5-271471 and 6-107854. The antidegradant is added in a proportion of preferably 0.01 to 1% by mass, more preferably 0.01 to 0.2% by mass based on the prepared solution (dope). When the proportion is less than 0.01% by mass, the effect of antidegradant is hardly found. When the proportion is more than 1% by mass, the antidegradant may bleed out on the surface of the film (exudation). Particularly preferred examples of anti-degradants include butylated hydroxytoluene (BHT) and tribenzylamine (TBA).

Next, stretching of polymer film is described. The retardation of the prepared cellulose acetate film (polymer film) can be further adjusted by stretching. The stretching ratio is preferably 3 to 100%. The polymer film has a thickness of preferably 40 to 140 μm, more preferably 70 to 120 μm. Further, by controlling these stretching conditions, the standard deviation of the slow axis angle of an optical compensation film can be made smaller.

While the stretching method is not particularly limited, examples thereof include a method of stretching using a tenter. When the film prepared by the above-described solvent casting process is horizontally stretched using a tenter and the conditions of the film is controlled after stretching, the standard deviation of the slow axis angle of the film can be made smaller. Specifically, when stretching is performed using a tenter to control the retardation value and the polymer film immediately after stretching is maintained as is at about the glass transition temperature of the film, the standard deviation of the slow axis angle can be made smaller.

When the film is maintained at a temperature lower than the glass transition temperature of the film, the standard deviation is increased. In another example, when the distance between rolls is increased upon longitudinal stretching between the rolls, the standard deviation of the slow axis angle can be made smaller.

The surface treatment of the polymer film is now described. In the case that the polymer film is used as a transparent protective film for a polarizing plate, the polymer film is preferably surface-treated. As such surface treatment, corona discharge, glow discharge, flame treatment, acid treatment, alkali treatment or ultraviolet irradiation is performed. Performing acid treatment or alkali treatment, i.e., saponification treatment on a polymer film, is particularly preferred.

Next, the orientation film is described. An orientation film has a function to determine the orientation direction of discotic liquid crystal molecules in an optically anisotropic layer. The orientation film may be formed by a method such as rubbing treatment of an organic compound (preferably polymer), oblique evaporation of an inorganic compound, formation of a layer having a microgroove or accumulation of an organic compound (e.g., ω-tricosanic acid, dioctadecylmethylammonium chloride, methyl stearate) by the Langmuir-Blodgett method (LB film). Further, orientation films whose orienting function is exhibited by applying an electric or magnetic field to the film or irradiating the film with light are also known.

The orientation film is preferably formed by rubbing a polymer. Polyvinyl alcohol is preferred as the polymer. Modified polyvinyl alcohol in which a hydrophobic group is bonded is particularly preferred. Since hydrophobic groups are compatible with discotic liquid crystal molecules of the optically anisotropic layer, discotic liquid crystal molecules can be uniformly oriented by introducing hydrophobic groups into polyvinyl alcohol.

The hydrophobic group is bonded to the terminal of a main chain or a side chain of polyvinyl alcohol. Preferred hydrophobic groups are aliphatic groups having 6 or more carbon atoms (preferably an alkyl group or an alkenyl group) and aromatic groups. When a hydrophobic group is bonded to the terminal of a main chain of polyvinyl alcohol, it is preferred that a linking group is introduced between the hydrophobic group and the main chain terminal. Examples of linking groups include —S—, —C(CN)$R_1$—, —$NR_2$—, —CS— and a combination thereof. The above $R_1$ and $R_2$ are each a hydrogen atom or an alkyl group having 1 to 6 carbon atoms (preferably an alkyl group having 1 to 6 carbon atoms).

To introduce a hydrophobic group into a side chain of polyvinyl alcohol, part of the acetyl groups (—CO—$CH_3$) in the vinyl acetate units of polyvinyl alcohol may be substituted by an acyl group (—CO—$R_3$) having 7 or more carbon atoms. $R_3$ is an aliphatic group having 6 or more carbon atoms or an aromatic group. A commercially available modified polyvinyl alcohol (e.g., MP103, MP203, R1130 available from Kuraray Co., Ltd.) may also be used. It is preferred that (modified) polyvinyl alcohol used for an orientation film has a saponification degree of 80% or higher. It is preferred that (modified) polyvinyl alcohol preferably has a polymerization degree of 200 or higher.

The rubbing treatment is performed by rubbing the surface of an orientation film with paper or cloth several times in a certain direction. A cloth to which fibers having uniform length and diameter are evenly transplanted is preferably used. Even if an orientation film is removed after orienting discotic liquid crystal molecules in the optically anisotropic layer using the orientation film, the orientation condition of the discotic liquid crystal molecules can be maintained. In other words, while an orientation film is essential for orienting discotic liquid crystal molecules in the production of an elliptically polarizing plate, it is not essential in the produced optical compensation film.

When an orientation film is disposed between a transparent web W and an optically anisotropic layer, an undercoat layer (adhesive layer) may be formed between the transparent web W and the orientation film. For stabilization of the surface shape, citrate may be added according to need.

The optically anisotropic layer is now described. The optically anisotropic layer is formed from discotic liquid crystal molecules. In general, the discotic liquid crystal molecules are optically negatively uniaxial. In the optical compensation film according to the present invention, it is preferred that the angle formed by the disc plane of discotic liquid crystal molecules and the plane of the transparent web W varies in the depth direction of the optically anisotropic layer (being in hybrid orientation). The optical axis of discotic liquid crystal molecules is in the direction of the normal line of the disc plane.

The discotic liquid crystal molecules are birefringent and the refractive index in the disc plane direction is larger than the refractive index in the optical axis direction. An optically anisotropic layer is preferably formed by orienting discotic liquid crystal molecules by the above-described orientation film and fixing the oriented discotic liquid crystal molecules. The discotic liquid crystal molecules are preferably fixed by a polymerization reaction.

In the optically anisotropic layer, the retardation value is not 0 in any direction. In other words, the minimum retardation value of the optically anisotropic layer is greater than 0. More specifically, it is preferred that the optically anisotropic layer has a Re retardation value defined by the following formula (I) within the range of 10 to 100 nm, a Rth retardation value defined by the following formula (II) within the range of 40 to 250 nm, and an average tilt angle of discotic liquid crystal molecules of 20 to 50°.

$$Re = (nx - ny) \times d \quad (I)$$

$$Rth = \{(n2 + n3)/2 - n1\} \times d \quad (II)$$

In the formula (1), nx represents the in-plane refractive index in the slow axis direction of the optically anisotropic layer, ny represents the in-plane refractive index in the fast axis direction of the optically anisotropic layer, and d represents the thickness of the optically anisotropic layer. In the formula (II), n1 represents the minimum principal refractive index in the case of approximation for the optically anisotropic layer using a refractive index ellipsoid, n2 and n3 represent other principal refractive indexes of the optically anisotropic layer and d represents the thickness of the optically anisotropic layer.

Discotic liquid crystal molecules are disclosed in various literatures (C. Destrade et. al., Mol. Crysr. Liq. Cryst., vol. 71; page 111 (1981); Survey of Chemistry, Quarterly, No. 22, "Chemistry of Liquid Crystal", Chapter 5 and Chapter 10, Section 2, edited by Chemical Society of Japan (1994); B. Kohne et al., Angew. Chem. Soc. Chem. Comm., page 1794 (1985); J. Zhang et al., J. Am. Chem. Soc., vol. 116, page 2655 (1994)). Polymerization of discotic liquid crystal molecules is described in Japanese Patent Application Laid-Open No. 8-27284.

To fix discotic liquid crystal molecules by polymerization, it is necessary that a polymerizable group is bonded to disc-like core of discotic liquid crystal molecules as a substituent. However, when the polymerizable group is directly bonded to the disc-like core, it is difficult to maintain the orientation state during a polymerization reaction. Thus, a linking group is to be introduced between the disc-like core and the polymerizable group. Accordingly, it is preferred that discotic liquid crystal molecules containing a polymerizable group are a compound represented by the following formula (III):

In the formula (III), D represents disc-like core, L represents a divalent linking group, Q represents a polymerizable group and n represents an integer of 4 to 12.

Examples of disc-like core (D) are described below. In each of the following examples, LQ (or QL) means a combination of a divalent linking group (L) and a polymerizable group (O).

In the formula (I), the divalent linking group (L) is preferably selected from the group consisting of alkylene groups, alkenylene groups, arylene groups, —CO—, —NH—, —O—, —S— and combinations thereof. The divalent linking group (L) is more preferably those obtained by combining at least two divalent groups selected from the group consisting of alkylene groups, arylene groups, —CO—, —NH—, —O— and —S—. The divalent linking group (L) is most preferably those obtained by combining at least two divalent groups selected from the group consisting of alkylene groups, arylene groups, —CO— and —O—. The alkylene group preferably has 1 to 12 carbon atoms. The alkenylene group preferably has 2 to 12 carbon atoms. The arylene group preferably has 6 to 10 carbon atoms.

Examples of divalent linking groups (L) are described below. The linking group is bonded to the disc-like core (D) on the left side and to the polymerizable group (O) on the right side. AL represents an alkylene group or an alkenylene group and AR represents an arylene group. The alkylene group, the alkenylene group and the arylene group may have a substituent (e.g., an alkyl group).

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O—CO—
L23: —S-AL-S-AL-
L24: —S-AR-AL-

The polymerizable group (Q) in the formula (I) is determined based on the kind of the polymerization reaction.

The polymerizable group (O) is preferably an unsaturated polymerizable group (Q1 to Q7) or an epoxy group (Q8), more preferably an unsaturated polymerizable group, and most preferably an ethylenically unsaturated polymerizable group (Q1 to Q6). In the formula (III), n represents an integer of 4 to 12. The number is specifically determined based on the kind of the disc-like core (D). As for the combination of a plurality of Ls and Qs, they may be different, but are preferably the same.

The optically anisotropic layer is formed by applying a coating solution containing discotic liquid crystal molecules and, if necessary, a polymerization initiator or optional components, to an orientation film. The optically anisotropic layer has a thickness of preferably 0.5 to 100 µm, further preferably 0.5 to 30 µm.

The oriented discotic liquid crystal molecules are fixed with maintaining the orientation state. The fixation is preferably performed by a polymerization reaction. The polymerization reaction includes thermal polymerization using a thermal polymerization initiator and photopolymerization using a photoinitiator, and photopolymerization is preferred. Examples of photoinitiators include α-carbonyl compounds (described in U.S. Pat. Nos. 2,367,661 and 2,367,670), acyloin ethers (described in U.S. Pat. No. 2,448,828), α-hydrocarbon substituted aromatic acyloin compounds (described in U.S. Pat. No. 2,722,512), polynuclear quinone compounds (described in U.S. Pat. Nos. 3,046,127 and 2,951,758), combinations of triarylimidazole dimer and p-aminophenyl ketone (described in U.S. Pat. No. 3,549,367), acridine compounds and phenazine compounds (described in Japanese Patent Application Laid-Open No. 60-105667 and U.S. Pat. No. 4,239,850) and oxadiazole compounds (U.S. Pat. No. 4,212,970).

The photoinitiator is used in a proportion of preferably 0.01 to 20% by mass, more preferably 0.5 to 5% by mass based on the solid content of the coating solution. For photoirradiation in polymerization of discotic liquid crystal molecules, ultraviolet light is preferably used. The irradiation energy is preferably 20 to 5000 mJ/cm$^2$, more preferably 100 to 800 mJ/cm$^2$. To promote the photopolymerization reaction, irradiation of light may be performed under heating. A protective layer may be formed on the optically anisotropic layer. For stabilizing the surface shape, citrate may be added where necessary.

The method for producing an optical film on the production line 10 for an optical film shown in FIG. 1 is now described, focusing on the rubbing treatment. First, a web W having a thickness of 40 to 300 µm on which a polymer layer for an orientation film is previously formed is fed from a feeder 66. The web W is guided by the guide roller 68 and introduced into the rubbing treatment apparatus 70 where the polymer layer is rubbed by the rubbing roller 72.

When rubbing the web W in the rubbing apparatus 70, the rubbing roller 72 standing by under the web W is first horizontally rotated so as to set the rubbing angle β. The rubbing roller 72 is then lifted to the pre-determined position or the back-up rollers 86, 88 are put down to the pre-determined position to place the orientation film surface of the web W over the rubbing roller 72.

Then, the back-up rollers 86, 88 and guide rollers 68, 68 transfer the web W in the direction of the arrow E. At the same time, the rubbing roller 72 is rotated in the direction opposite to the transfer direction E of the web W, i.e., in the direction of the arrow F.

In this step, the back-up rollers 86, 88 move along the slide rail 25 powered by the motor 23 so as to release the difference in the tension generated between both ends of the web W based on the detection result in the tension detector 22. The web W whose tension difference in the width direction is adjusted is continuously transferred over the rubbing roller 72, whereby the surface of the orientation film on the web W is continuously rubbed by the rubbing roller 72 in the direction of the arrow I.

In the rubbing treatment configured as above, the guide rollers 68, 68 are disposed so that the wrap angle of the web W on the back-up rollers 86, 88 is 60° or more and 120° or less, and the back-up rollers 86, 88 are rotationally displaced at 60° to 120° in the direction perpendicular to the incoming direction of the web W toward the back-up rollers 86, 88 based on the detection result in the tension detector 22 which detects the difference in the tension in the width direction of the web W contacting the rollers.

As a result, the transfer tension of the web W is kept constant in the width direction, making the contact between the web W and the rubbing roller 72 uniform upon rubbing treatment. Further, when the back-up rollers 86, 88 are rotationally displaced in the above-described direction, the displacement of the web W in the width direction can be controlled to the minimum upon rubbing treatment.

Gas is then sprayed to the backside of the web W through the air nozzle 50 located above the rubbing roller 72 at a uniform pressure in the width direction, allowing the web W to be pressed against the rubbing roller 72.

It is preferred that the spraying pressure (applied pressure) of the gas through the air nozzle 50 is within the range of 900 to 7000 Pa and the spraying (applying) time of the gas is 0.0045 to 0.015 second. Pressurization under such conditions ensures rubbing conditions with an appropriate amount of work.

Due to the action of the above-described air nozzle 50, uneven orientation of the web W in the width direction can be minimized without generating wrinkles on the web W.

After the rubbing treatment, the dust removing device 74 removes dust adhered to the surface of the web W. A coating solution containing disconematic liquid crystal is then applied to the web W by the gravure coater 11.

Subsequently, the web W is transferred through the drying zone 76 and the heating zone 78 and liquid crystal is formed. Further, the liquid crystal layer is irradiated with an ultraviolet lamp 80 and the desired polymer is formed by cross-linking the liquid crystal. The web W on which the polymer is formed is taken up on the winder 82.

Another embodiment (second embodiment) of the rubbing method and the method and the apparatus for producing an optical film of the present invention is now described. The only difference between the second embodiment and the above-described first embodiment is in the construction of the air nozzle 50, and since the entire configuration of the production line 10 for an optical film is the same except for the above, its representation and detailed description are omitted.

Figure 6A:
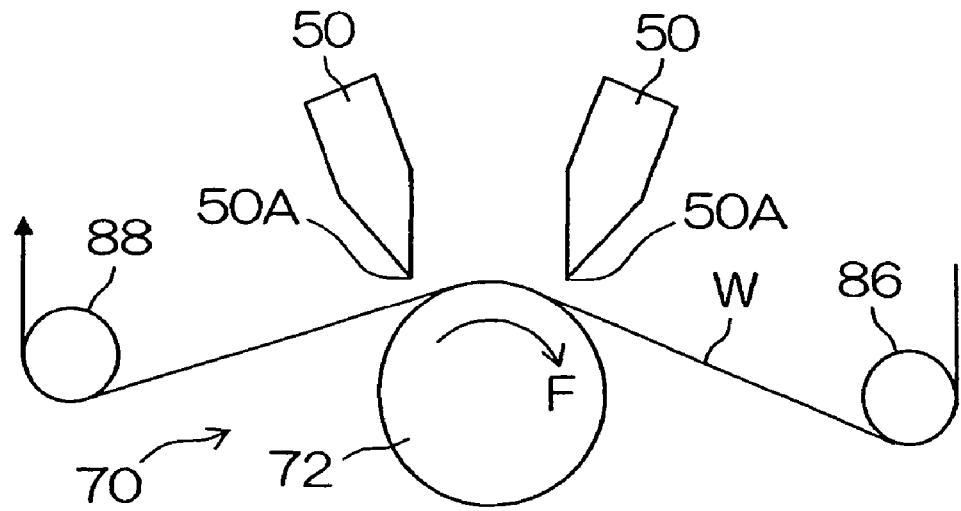
FIGS. 6A and 6B are enlarged front and left side views of essential parts illustrating the position of air nozzles and a rubbing treatment apparatus in the second embodiment.
Figure 6B:
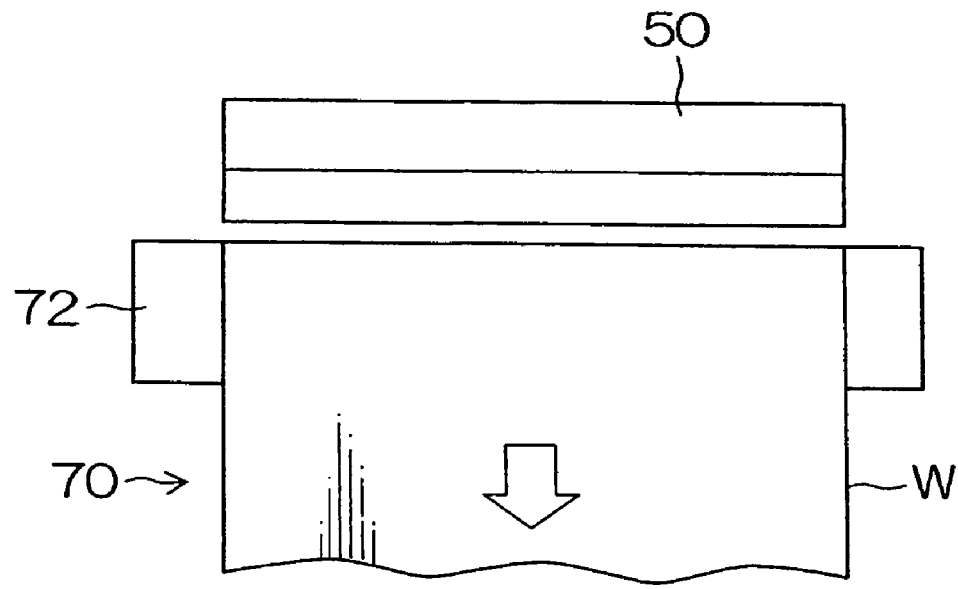

FIGS. 6A and 6B are enlarged views of essential parts illustrating the position of the air nozzles 50 and the rubbing treatment apparatus 70, which corresponds to FIGS. 2A and 2B of the first embodiment. FIG. 6A is a front view, and FIG. 6B is a left side view.

As shown in FIGS. 6A and 6B, unlike in the first embodiment, a pair of air nozzles 50 are disposed. Gas is sprayed to positions near both ends of the wrap angle of the web W through the air nozzles 50, 50. Thus, gas can be sprayed to the backside of the web W at a uniform pressure in the width direction of the web W, allowing the web W to be pressed against the rubbing roller 72. In particular, since the gas is sprayed to positions near both ends of the wrap angle of the web W, tension is applied to the web W in the longitudinal direction, which is effective for removing wrinkles generated in the web W.

The air nozzle 50 has substantially the same length as the width of the web W and is disposed so that the tip 50A, which is an outlet, is parallel to the axis of the rubbing roller 72 as in the first embodiment.

Still another embodiment (third embodiment) of the rubbing method and the method and the apparatus for producing an optical film of the present invention is now described. The only difference between the third embodiment and the first embodiment is in the construction of the air nozzle 50 (52), and since the entire configuration of the production line 10 for an optical film is the same except for the above, its representation and detailed description are omitted.

Figure 7A:
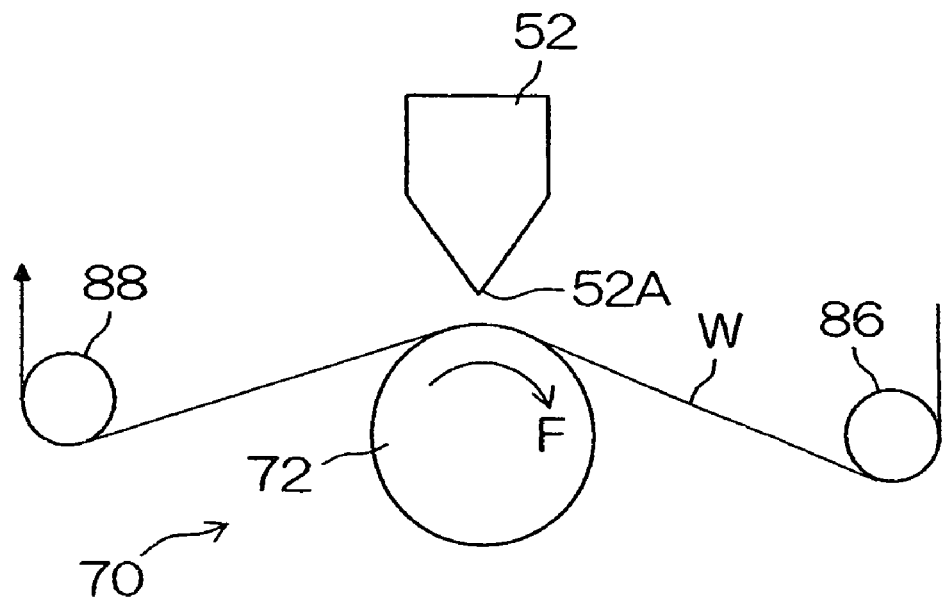
FIGS. 7A and 7B are enlarged front and left side views of essential parts illustrating the position of air nozzles and a rubbing treatment apparatus in the third embodiment.
Figure 7B:
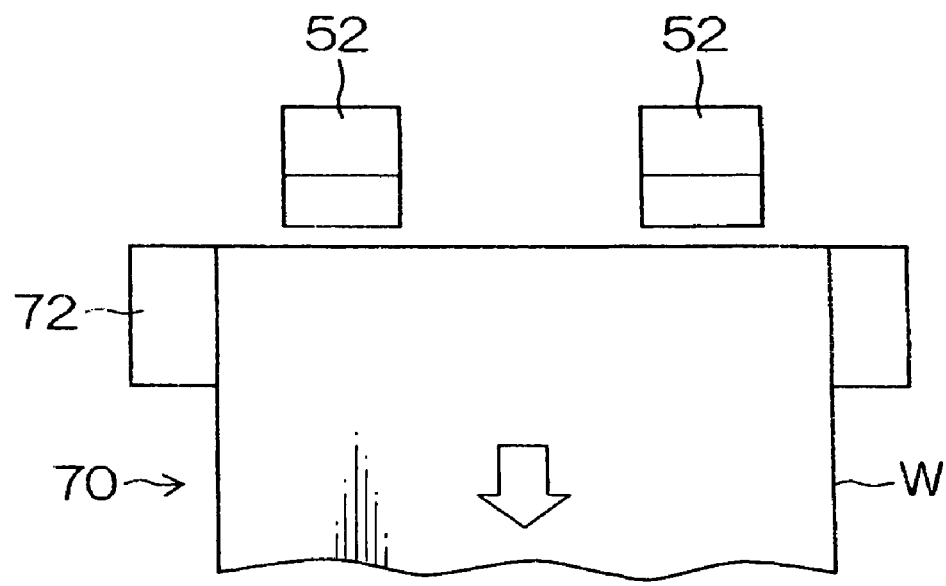

FIGS. 7A and 7B are enlarged views of essential parts illustrating the position of air nozzles 52 and a rubbing treatment apparatus 70, which corresponds to FIGS. 2A and 2B of the first embodiment. FIG. 7A is a front view, and FIG. 7B is a left side view.

As shown in FIGS. 7A and 7B, unlike in the fist embodiment, a pair of air nozzles 52 are disposed. The air nozzles 52 have the same cross-sectional shape as the air nozzle 50 of the first embodiment, but are shorter than the width of the web W. The air nozzles 52, 52 are disposed away from each other in the width direction of the web W, and the tips 52A, 52A, which are outlets, are parallel to the axis of the rubbing roller 72.

Gas is sprayed to the position of the center line bisecting the wrap angle of the web W through the air nozzles 52, 52 (in the circumferential direction of the rubbing roller 72). Further, gas is sprayed to positions slightly inside both ends of the web W through the air nozzles 52, 52 (in the longitudinal direction of the rubbing roller 72).

Accordingly, gas can be sprayed to the backside of the web W at a uniform pressure in the width direction, allowing the web W to be pressed against the rubbing roller 72. In particular, since the gas is sprayed to positions slightly inside both ends of the web W in the width direction at which wrinkles tend to be formed, wrinkles generated in that portions of the web W can be effectively removed.

Still another embodiment (fourth embodiment) of the rubbing method and the method and the apparatus for producing an optical film of the present invention is now described. The only difference between the fourth embodiment and the first embodiment is in the construction of the air nozzle 50 (52), and since the entire configuration of the production line 10 for an optical film is the same except for the above, its representation and detailed description are omitted.

Figure 8A:
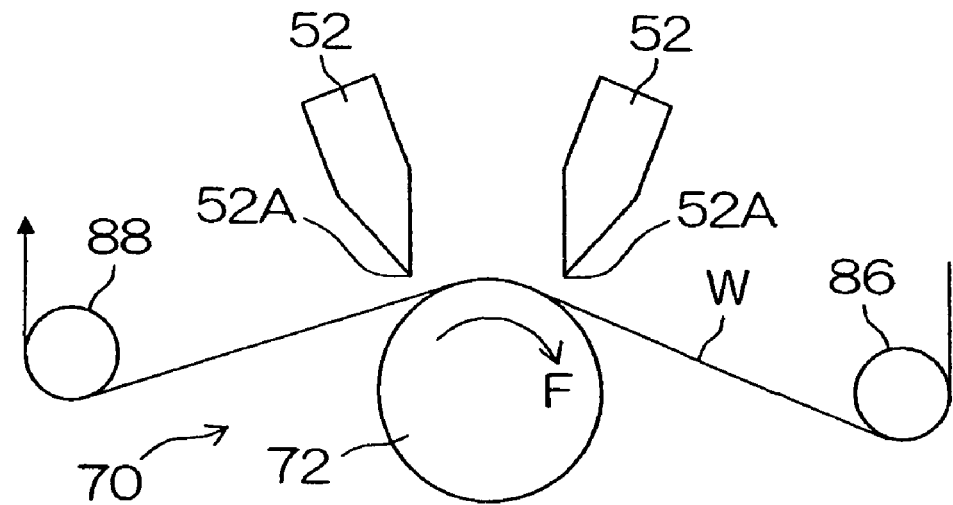
FIGS. 8A and 8B are enlarged front and left side views of essential parts illustrating the position of air nozzles and a rubbing treatment apparatus in the fourth embodiment.
Figure 8B:
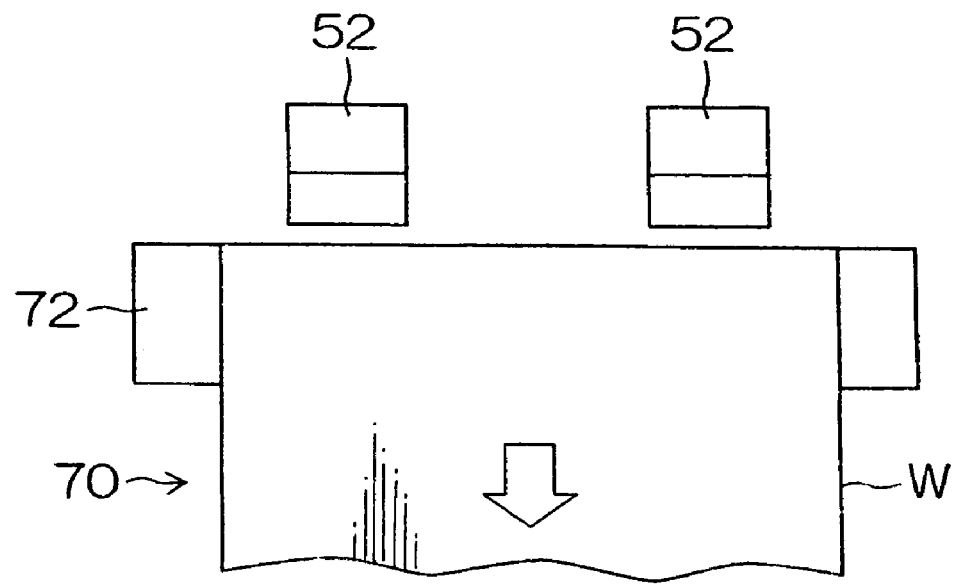

FIGS. 8A and 8B are enlarged views of essential parts illustrating the position of air nozzles 52 and a rubbing treatment apparatus 70, which corresponds to FIGS. 2A and 2B of the first embodiment. FIG. 8A is a front view, and FIG. 8B is a left side view.

As shown in FIGS. 8A and 8B, unlike in the fist embodiment, four air nozzles 52 are disposed. Gas is sprayed to positions near both ends of the wrap angle of the web W through air nozzles 52, 52 . . . . Further, as in the third embodiment, the air nozzles 52 are shorter than the width of the web W. The air nozzles 52, 52 are disposed away from each other in the width direction of the web W and the tips 52A, 52A, which are outlets, are parallel to the axis of the rubbing roller 72.

Accordingly, gas can be sprayed to the backside of the web W at a uniform pressure in the width direction, allowing the web W to be pressed against the rubbing roller 72. In particular, since the gas is sprayed to positions near both ends of the wrap angle of the web W, tension is applied to the web W in the longitudinal direction, effectively removing wrinkles generated in the web W. Further, since the gas is sprayed to positions slightly inside both ends of the web W in the width direction, wrinkles generated in that portions of the web W can be effectively removed.

Still another embodiment (fifth embodiment) of the rubbing method and the method and the apparatus for producing an optical film of the present invention is now described. The only difference between the fifth embodiment and the first embodiment is in the construction of the air nozzle 50 (air chamber 54), and since the entire configuration of the production line 10 for an optical film is the same except for the above, its representation and detailed description are omitted.

Figure 9A:
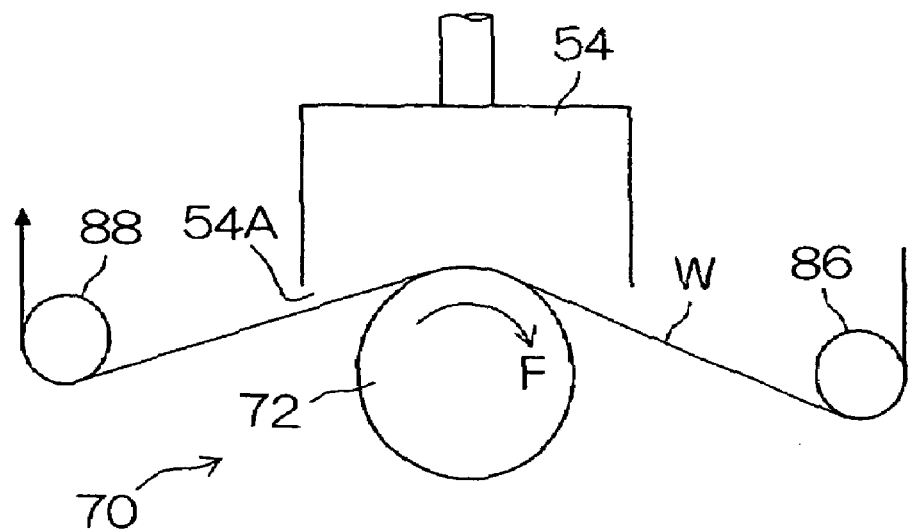
FIGS. 9A and 9B are enlarged front and left side views of essential parts illustrating the position of an air nozzle and a rubbing treatment apparatus in the fifth embodiment.
Figure 9B:
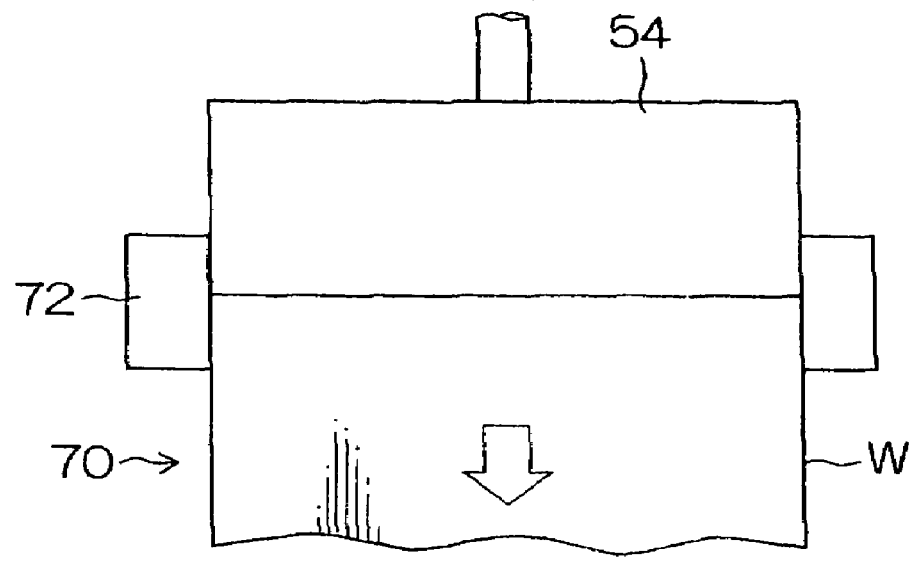

FIGS. 9A and 9B are enlarged views of essential parts illustrating the position of an air chamber 54 and a rubbing treatment apparatus 70, which corresponds to FIGS. 2A and 2B of the first embodiment. FIG. 9A is a front view, and FIG. 9B is a left side view.

As shown in FIGS. 9A and 9B, unlike in the first embodiment, an air chamber 54 is disposed instead of the air nozzle 50. The air chamber 54 is a square-shaped housing, and an opening 54A opened at the bottom has an inside length substantially the same as the width of the web W (including the width of the web W in the case where a pre-determined rubbing angle is given) and an inside width substantially the same as the width corresponding to a pre-determined circumferential angle of the rubbing roller 72. Gas is supplied to the air chamber 54 through an unrepresented air supply device (an air tube, a blower or an air compressor, etc.).

When such an air chamber 54 which entirely covers the running web W in the width direction in a predetermined length is used to press the web W against the rubbing roller 72 by gas in the air chamber 54, pressure close to static pressure can be applied. Thus, in addition to an advantage of being able to perform uniform rubbing without generating wrinkles on the web, there is an advantage that the amount of gas can be reduced compared to the case of spraying gas using a nozzle.

Although embodiments of the rubbing method and the method and the apparatus for producing an optical film of the present invention have been described, the present invention is not limited to the above-described embodiments, and can be embodied in various modes.

For example, while a pressurizing device using gas is used as a device for applying fluid pressure in the embodiments, the pressurizing device using liquid described earlier, e.g., a configuration in which water is filled in a flexible bag (a bag made of resin or rubber) and the web W is pressed against the rubbing roller 72 by putting the bag on the backside of the web W can also be adopted instead of the above.

As for the configuration of the air nozzles 50, 52 and the air chamber 54, various configurations other than those in the above embodiments may be adopted.

Further, although a coating solution containing disconematic liquid crystal is disclosed in the above embodiments, other types of coating solution for optical films or a coating solution not for optical films may also be used.

EXAMPLES

Optical films (optical compensation films) were produced on the production line 10 for an optical film shown in FIG. 1 under various conditions.

A 5% by weight long chain alkyl modified poval (MP-203 available from Kuraray Co., Ltd.) solution was applied to one side of a long web W made of triacetyl cellulose (FUJITAC available from FUJI PHOTO FILM CO., LTD., thickness: 80 μm, width: 1340 mm). The applied film was dried at 90° C. for 4 minutes and then rubbed, whereby a resin layer for forming an orientation film having a film thickness of 2.0 μm was formed.

The transfer rate of the web W was 24 n/minute. In the triacetyl cellulose film, when the refractive index in two perpendicular directions in the film plane is defined as nx and ny, the refractive index in the thickness direction is defined as nz, and the thickness of the film is defined as d, (nx−ny)×d=16 nm, {(nx−ny)/2−nz}×d=75 nm. Further, the above-described resin layer for forming an orientation film was formed through the production line 10 for an optical film shown in FIG. 1.

Example 1

The above-described web W was fed from the feeder 66 in the production line 10 for an optical film, around which the web W was wound, at a transfer rate of 40 m/minute. The surface of the resin layer was rubbed in the rubbing treatment apparatus 70 while continuously transferring the web W at 40 m/minute.

The rubbing treatment was performed under conditions of a wrap angle of the rubbing roller 72 of 8°, an outer diameter of the rubbing roller 72 of 300 mm, a rotation number of the rubbing roller 72 of 500 rpm, a rubbing angle β of 4.5° and a transfer tension of the web W of 290 N/m.

The distance (clearance) between the tip 50A of the air nozzle 50 and the backside of the web W upon rubbing treatment was set to 10 mm. The tip 50A of the air nozzle 50 has an opening width of 1 mm. The air pressure inside the air nozzle 50 was 10 kPa.

The found value of the injection pressure of air through the air nozzle 50 was 2400 Pa. The measurement of the injection pressure of the air was performed by reading the air pressure applied to a needle (small cylindrical needle) embedded in a dummy rubbing roller 72 so that the tip is flush with the roller surface by a manometer connected to the backside of the needle.

As Comparative Examples, samples to which air is not sprayed through the air nozzle 50 were also prepared.

Then, while continuously transferring the obtained web W having an orientation film thereon at 40 m/minute, a 10% by weight methyl ethyl ketone solution of a mixture obtained by adding 1% by weight of a photoinitiator (Irgacure 907 available from Ciba Geigy Japan Limited) to a mixture of discotic compound TE-8 (3) and TE-8 mixed at a weight ratio of 4:1 (coating solution) based on the mixture was applied to the orientation film by the gravure coater 11 at a coating amount of 5 ml/m². The web W was then passed through the drying zone 76 and the heating zone 78.

Air was introduced into the drying zone 76 at 0.1 μm/second and the temperature of the heating zone 78 was set to 130° C. The web W entered the drying zone 76 three seconds after application and entered the heating zone 78 the next three seconds thereafter. The web W passed through the heating zone 78 in about 3 minutes.

Subsequently, while continuously transferring the web W to which an orientation film and a liquid crystal layer were applied at 40 m/minute, the surface of the liquid crystal layer was irradiated with ultraviolet light by the ultraviolet lamp 80. More specifically, the web W which has passed through the heating zone 78 was irradiated with ultraviolet light at an illuminance of 600 mW by the ultraviolet lamp 80 (output: 160 W/cm, light emission length: 1.6 m) for 4 seconds to crosslink the liquid crystal layer.

Optical properties of the surface of the web W on which an orientation film and a liquid crystal layer were formed were measured and examined by an inspection apparatus. A protective film was then stacked on the surface of the liquid crystal layer by a laminating machine (not shown) and the entire web was taken up by the winder 82, whereby an optical compensation film was obtained.

The obtained optical compensation film was evaluated by assessing orientation based on extinction values. For the evaluation of orientation based on extinction values, an extinction meter made by Otsuka Electronics, Co., Ltd. was used. In the meter, the measurement wavelength was set to 550 nm and the transmittance of the polarizing plates in a parallel nicol arrangement was 100%. The orientation of two discotic liquid crystals in a cross nicol arrangement was evaluated.

In the evaluation of orientation based on extinction values, the smaller the extinction value, the higher the orientation. For the evaluation of orientation, quantitative evaluation of orientation degrees ranging from good orientation (100%) to poor orientation (0%) was employed.

Figure 10:
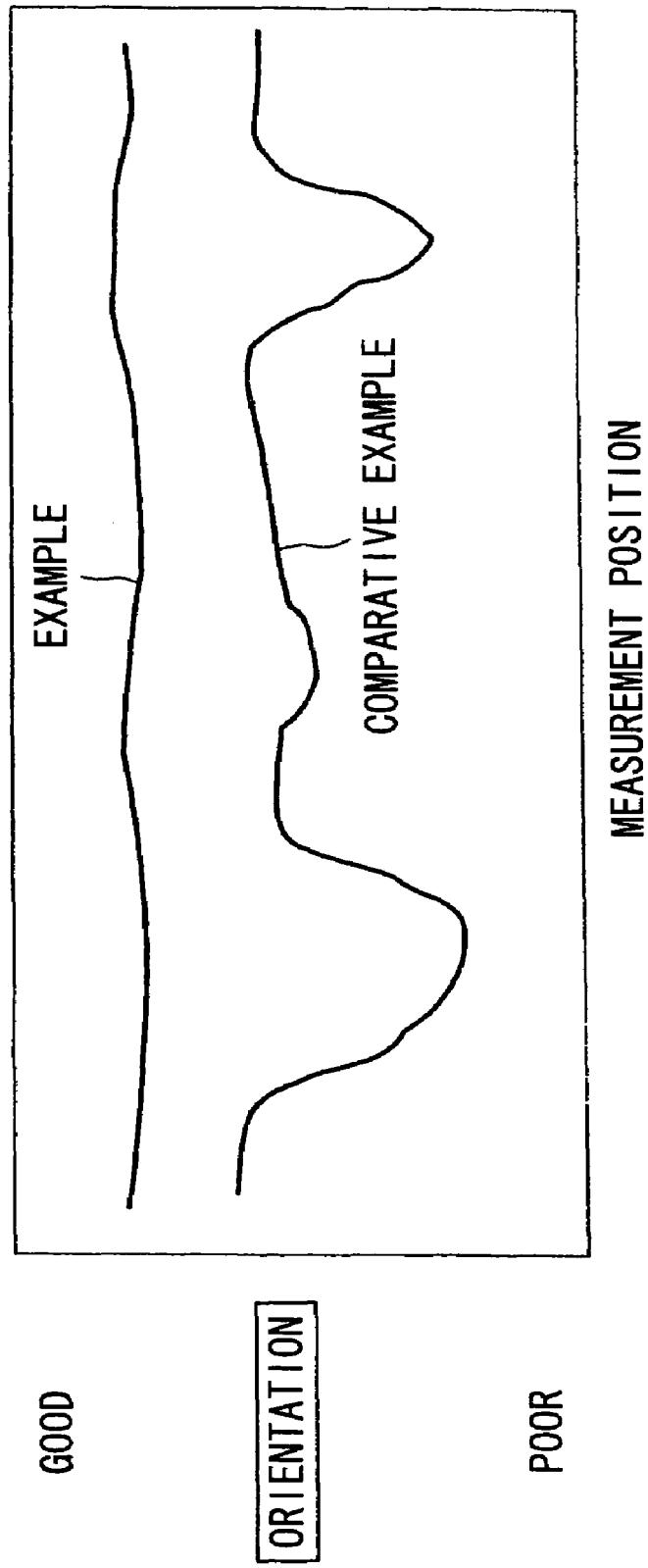
FIG. 10 is a graph showing the results in Example 1.

The evaluation results are shown in the graph in FIG. 10. In the graph, the horizontal axis represents measurement positions in the width direction of the web W and the vertical axis represents orientation degrees based on evaluation of extinction values.

The graph in FIG. 10 shows that orientation is excellent in all positions in the width direction of the web W in Examples. On the other hand, in Comparative Examples, orientation is deteriorated at some positions in the width direction of the web W, decreasing the entire orientation level. From the above evaluation results, the advantages of the present invention have been confirmed.

Example 2

The aforementioned web W (1.34 m in width) was fed from the feeder 66 in the production line 10 for an optical film, around which the web W was wound, at a transfer rate of 24 m/minute. While continuously transferring the web W at V=24 m/minute, the surface of the resin layer was rubbed in the rubbing treatment apparatus 70.

The rubbing treatment was performed under conditions of a wrap angle of the rubbing roller 72 of 4°, an outer diameter of the rubbing roller 72 of 300 mm, a rotation number of the rubbing roller 72 of 400 rpm and 500 rpm, a rubbing angle β of 4° and a transfer tension N of the web W of 180 N/m and 280 N/m.

The coefficient of dynamic friction μ of the rubbing roller 72 was measured in a test and a value of 1.06 was obtained.

The coefficient was measured by setting a 2 cm square rubbing cloth (attached to a stainless steel plate) in a dynamic friction tester and sliding the cloth against the orientation film surface. The moving speed was 1200 mm/minute and the load was 70 g/4 cm².

The distance (clearance) between the tip 50A of the air nozzle 50 and the backside of the web W upon rubbing treatment was set to 10 mm. The tip 50A of the air nozzle 50 has an opening width of 1 mm. The injection pressure P of air through the air nozzle 50 was measured as in Example 1. The pressing width S on the web W by the air nozzle 50 was 3 mm.

In FIGS. 11A and 11B described later, pressing pressure N1 (=P×S×W) by the air nozzle 50 and work Fs (=μ×N1×πD) of the air nozzle 50 per rotation are each calculated.

Then, while continuously transferring the obtained web W having an orientation film thereon at 24 m/minute, the same coating solution as used in Example 1 was applied to the orientation film by the gravure coater 11 in a coating amount of 5 ml/m². The web W was then passed through the drying zone 76 and the heating zone 78 to be treated under the same conditions as in Example 1. The liquid crystal layer was cross-linked by irradiating the surface of the liquid crystal layer with ultraviolet light by the ultraviolet lamp 80 under the same conditions as in Example 1.

The obtained optical compensation film was evaluated by assessing orientation based on extinction values and by visual observation of the presence or absence of streak unevenness. The orientation was evaluated based on extinction values as in Example 1. Whether there are wrinkles on the web W upon rubbing treatment or not was visually observed. Further, the life of the rubbing cloth was evaluated under certain test conditions.

The above test conditions and evaluation results are summarized in the tables in FIGS. 11A and 11B. FIG. 11A shows the test conditions, and FIG. 11B shows the evaluation results.

Comparison between sample 1 and samples 2, 3 has revealed that the intended extinction degree (orientation) can be obtained and wrinkles upon rubbing can be reduced by employing air press. In other words, it has been found that wrinkles on the web W upon rubbing can be reduced by applying an air press pressure of 900 Pa or higher (sample 2) and the intended orientation properties (extinction degree, unevenness) can be obtained by applying an air press pressure of 900 Pa or higher (sample 2), preferably 1400 Pa or higher (sample 3).

Since stripes (streaks caused by rubbing) were found when an air press pressure of 9000 Pa was applied (sample 8), a preferred air press pressure was proved to be 7000 Pa (sample 7) or lower.

Example 3

The aforementioned web W (1.34 m in width) was fed from the feeder 66 in the production line 10 for an optical film, around which the web W was wound, at a transfer rate of 24 m/minute. While continuously transferring the web W at V=24 m/minute, the surface of the resin layer was rubbed in the rubbing treatment apparatus 70.

The rubbing treatment was performed under conditions of a wrap angle of the rubbing roller 72 of 4°, an outer diameter of the rubbing roller 72 of 300 mm, a rotation number of the rubbing roller 72 of 400 rpm and 500 rpm, a rubbing angle β of 4° and a transfer tension N of the web W of 180 N/m and 280 N/m.

The coefficient of dynamic friction μ of the rubbing roller 72 was measured in a test and a value of 1.06 was obtained.

The coefficient was measured by setting a 2 cm square rubbing cloth (attached to a stainless steel plate) in a dynamic friction tester and sliding the cloth against the orientation film surface. The moving speed was 1200 mm/minute and the load was 70 g/4 cm².

The distance (clearance) between the tip 50A of the air nozzle 50 and the backside of the web W upon rubbing treatment was set to 10 mm. The tip 50A of the air nozzle 50 has an opening width of 1 mm. The injection pressure P of air through the air nozzle 50 was measured as in Example 1. The pressing width S on the web W by the air nozzle 50 was 3 mm.

In FIG. 12A described later, pressing pressure N1 (=P×S×W) by the air nozzle 50 and work Fs (=μ×N1×πD) of the air nozzle 50 per rotation are each calculated.

Then, while continuously transferring the obtained web W having an orientation film thereon at 24 m/minute, the same coating solution as used in Example 1 was applied to the orientation film by the gravure coater 11 in a coating amount of 5 ml/m². The web W was then passed through the drying zone 76 and the heating zone 78 to be treated under the same conditions as in Example 1. The liquid crystal layer was cross-linked by irradiating the surface of the liquid crystal layer with ultraviolet light by the ultraviolet lamp 80 under the same conditions as in Example 1.

The obtained optical compensation film was evaluated by assessing orientation based on extinction values and by visual observation of the presence or absence of streak unevenness. The orientation was evaluated based on extinction values as in Example 1. Whether there are wrinkles on the web W upon rubbing treatment or not was visually observed. Further, the life of the rubbing cloth was evaluated under certain test conditions.

The test conditions and evaluation results are summarized in the tables in FIGS. 12A and 12B. FIG. 12A shows the test conditions, and FIG. 12B shows the evaluation results.

Comparison between sample 1 and sample 2, 3 has revealed that the intended extinction degree (orientation) can be obtained and wrinkles upon rubbing can be reduced by employing air press.

Comparison between sample 4 and samples 5, 6 has revealed that the intended extinction degree (orientation) can be obtained and wrinkles upon rubbing can be reduced by employing air press.

Comparison between sample 7 and samples 8, 9 has revealed that wrinkles upon rubbing can be reduced by employing air press.

Comparison between sample 7 and samples 5, 6 has revealed that the intended extinction degree (orientation) can be obtained, tension can be decreased, and wrinkles upon rubbing can be reduced by employing air press.

Comparison between sample 7 and sample 3 has revealed that the intended extinction degree (orientation) can be obtained, the rotation number of the rubbing roller can be decreased, the life of the rubbing cloth can be extended, and wrinkles upon rubbing can be reduced by employing air press.

What is claimed is:

1. A method for producing an optical film, comprising:
    performing rubbing treatment on a polymer layer for an orientation film over a belt-shaped flexible support by winding the support around a rotating rubbing roller with rubbing fabric made of flocked fabric while continuously transferring the support;
    pressing the support against the rubbing roller by applying a fluid pressure to a backside of the support; and
    forming a functional film by applying a coating solution to the polymer layer over the support by a coating device after the rubbing treatment,
    wherein
    the fluid pressure is applied to the support through a pair of nozzles respectively disposed opposite one another, and
    a direction of the fluid injected by one nozzle of said pair of nozzles intersects with a direction of the fluid injected by another nozzle of said pair of nozzles.

2. The method according to claim 1, wherein the fluid pressure is applied to the support by spraying gas to the backside of the support through the pair of nozzles having a length substantially the same as a width of the support.

3. The method according to claim 1, wherein the fluid pressure is applied to the support by spraying gas to the backside of the support through a plurality of pairs of nozzles disposed in a width direction of the support.

4. The rubbing method according to claim 1, wherein a fluid pressure of 900 to 7000 Pa is applied to the support for 0.0045 to 0.015 second.

5. The rubbing method according to claim 2, wherein a fluid pressure of 900 to 7000 Pa is applied to the support for 0.0045 to 0.015 second.

6. The rubbing method according to claim 3, wherein a fluid pressure of 900 to 7000 Pa is applied to the support for 0.0045 to 0.015 second.

7. The method according to claim 1, wherein the fluid pressure is applied to positions near both ends of the wrap angle of the support through the pair of nozzles.

* * * * *